(12) United States Patent
Suzuki

(10) Patent No.: US 9,648,145 B2
(45) Date of Patent: May 9, 2017

(54) COMMUNICATION APPARATUS AND METHOD THEREOF

(71) Applicant: CANON KABUSHIKI KAISHA, Tokyo (JP)

(72) Inventor: Tomoya Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/815,241

(22) Filed: Jul. 31, 2015

(65) Prior Publication Data

US 2016/0044140 A1    Feb. 11, 2016

(30) Foreign Application Priority Data

Aug. 7, 2014 (JP) .................. 2014-161894

(51) Int. Cl.
*H04L 29/06* (2006.01)

(52) U.S. Cl.
CPC .............. *H04L 69/04* (2013.01); *H04L 63/00* (2013.01)

(58) Field of Classification Search
None
See application file for complete search history.

(56) References Cited

U.S. PATENT DOCUMENTS

| | | | |
|---|---|---|---|
| 5,742,406 A | 4/1998 | Suzuki | 358/468 |
| 5,937,069 A | 8/1999 | Nagai et al. | 380/49 |
| 6,353,482 B1 | 3/2002 | Abe et al. | 358/1.15 |
| 7,769,900 B1 * | 8/2010 | Chalfin | G06T 9/004 709/231 |
| 8,549,165 B2 * | 10/2013 | Zhang | H03M 13/09 709/201 |
| 2005/0062997 A1 | 3/2005 | Hasegawa et al. | 358/1.13 |

OTHER PUBLICATIONS http://www.ietf.org/id/draft-ietf-httpbis-http2-13.txt (Jun. 17, 2014).
http://www.ietf.org/id/draft-ietf-httpbis-header-compression-08.txt (Jun. 17, 2014).

* cited by examiner

*Primary Examiner* — Hong Cho
(74) *Attorney, Agent, or Firm* — Fitzpatrick, Cella, Harper & Scinto

(57) ABSTRACT

A first table used for compression of a message to be transmitted to another communication apparatus and decompression of a compressed message received from the other communication apparatus is generated. After the first table is generated, the first table is updated based on data contained in a message to be transmitted to the other communication apparatus. The other communication apparatus is guided to transmit a predetermined message corresponding to a specific index in the first table. Integrity of the updated first table and a second table used in the other communication apparatus by referring to the predetermined message received from the other communication apparatus. The second table is used for compression of a message to be transmitted to the communication apparatus and decompression of a compressed message received from the communication apparatus in the other communication apparatus.

11 Claims, 23 Drawing Sheets

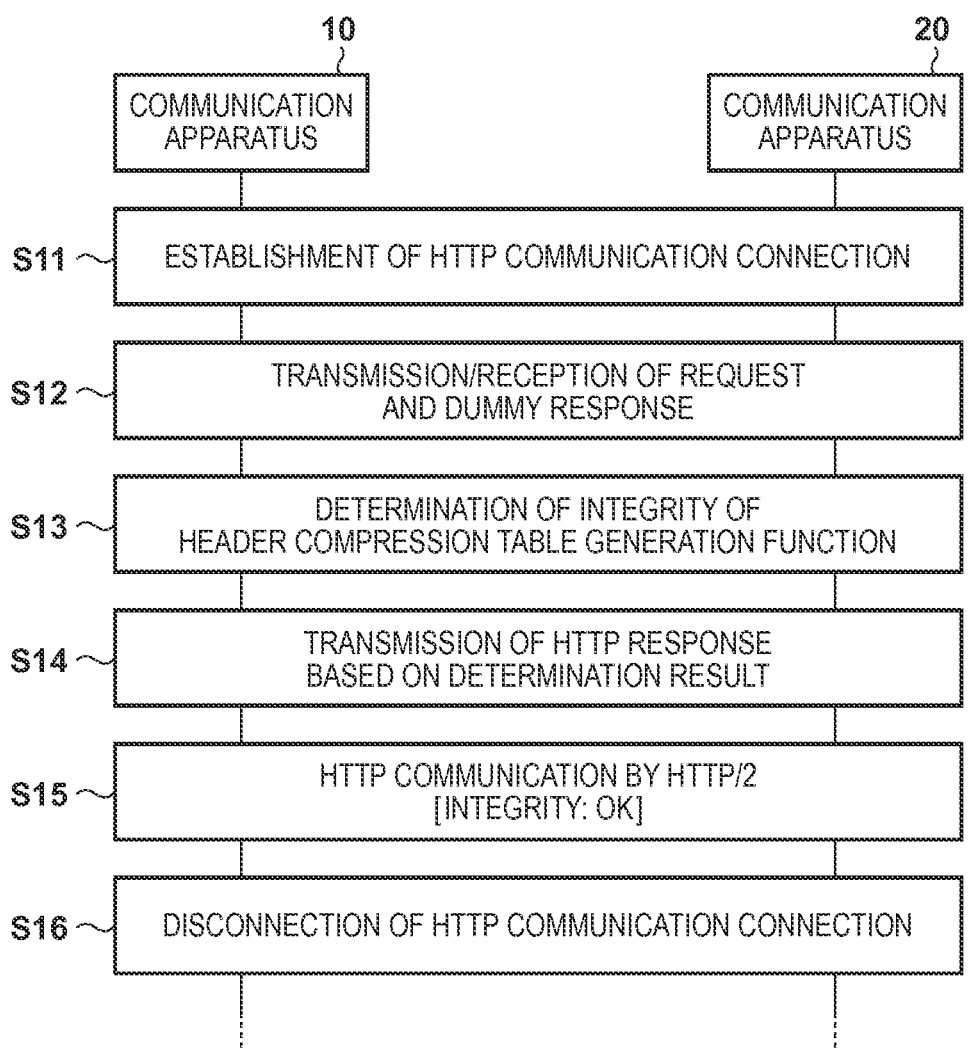

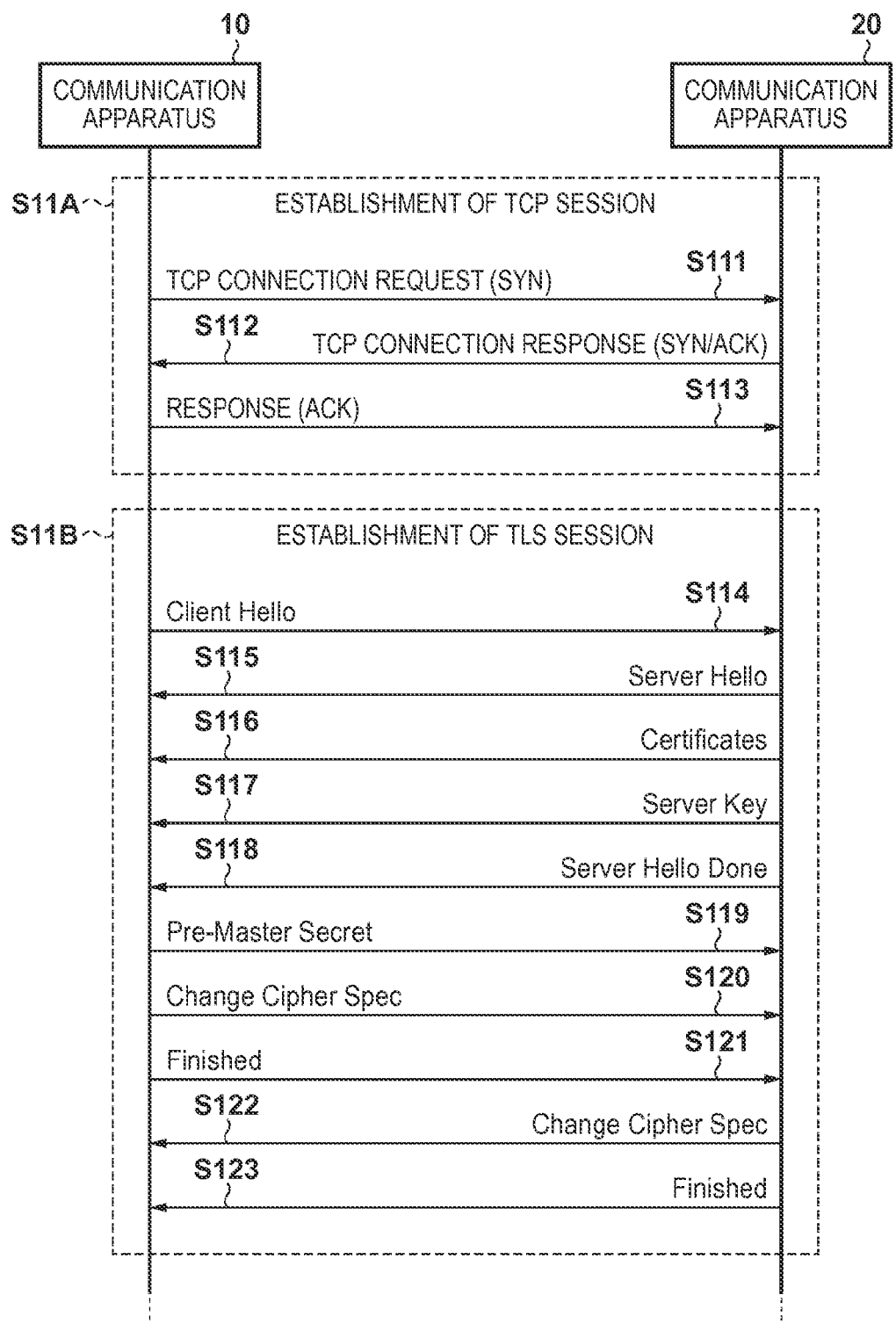

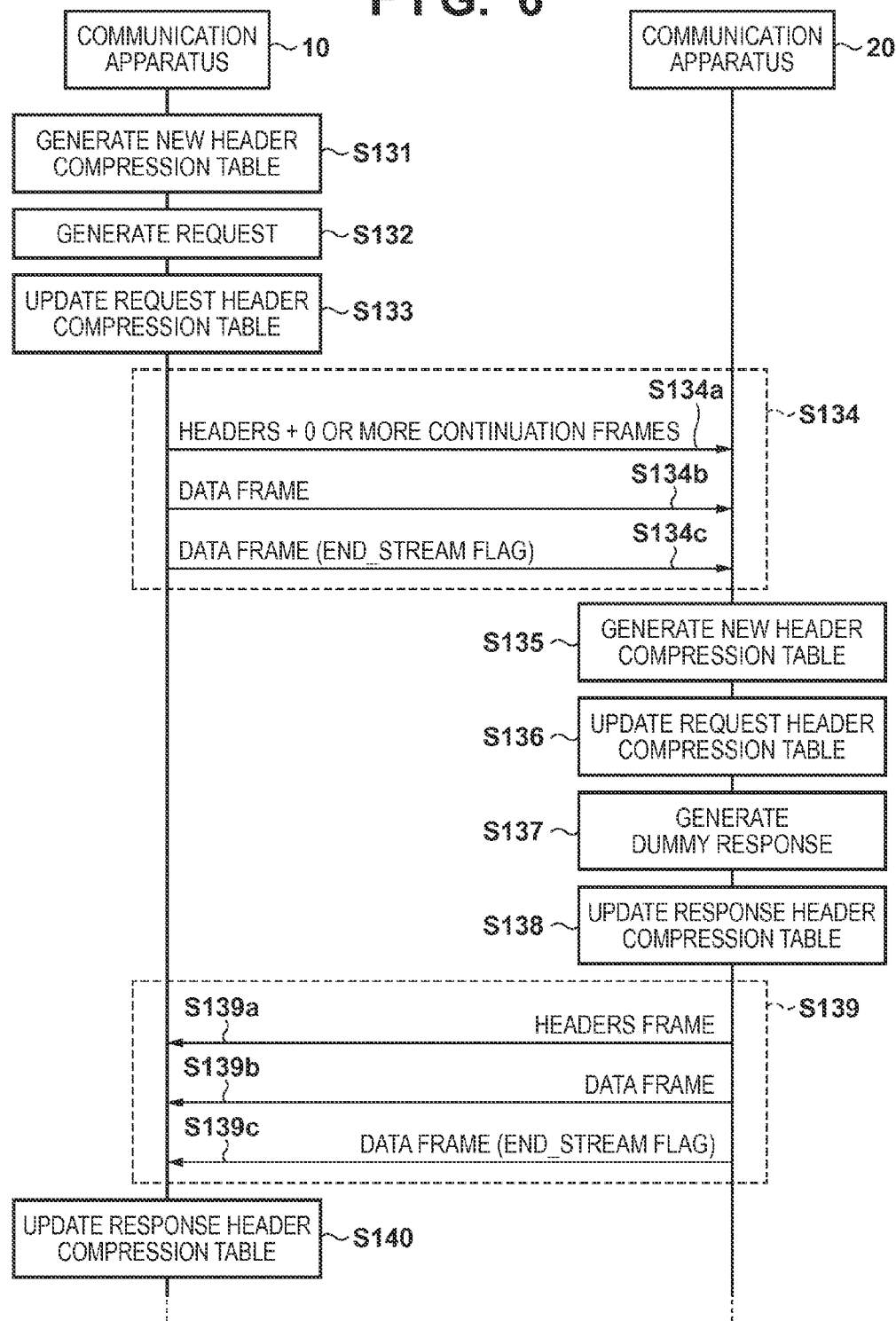

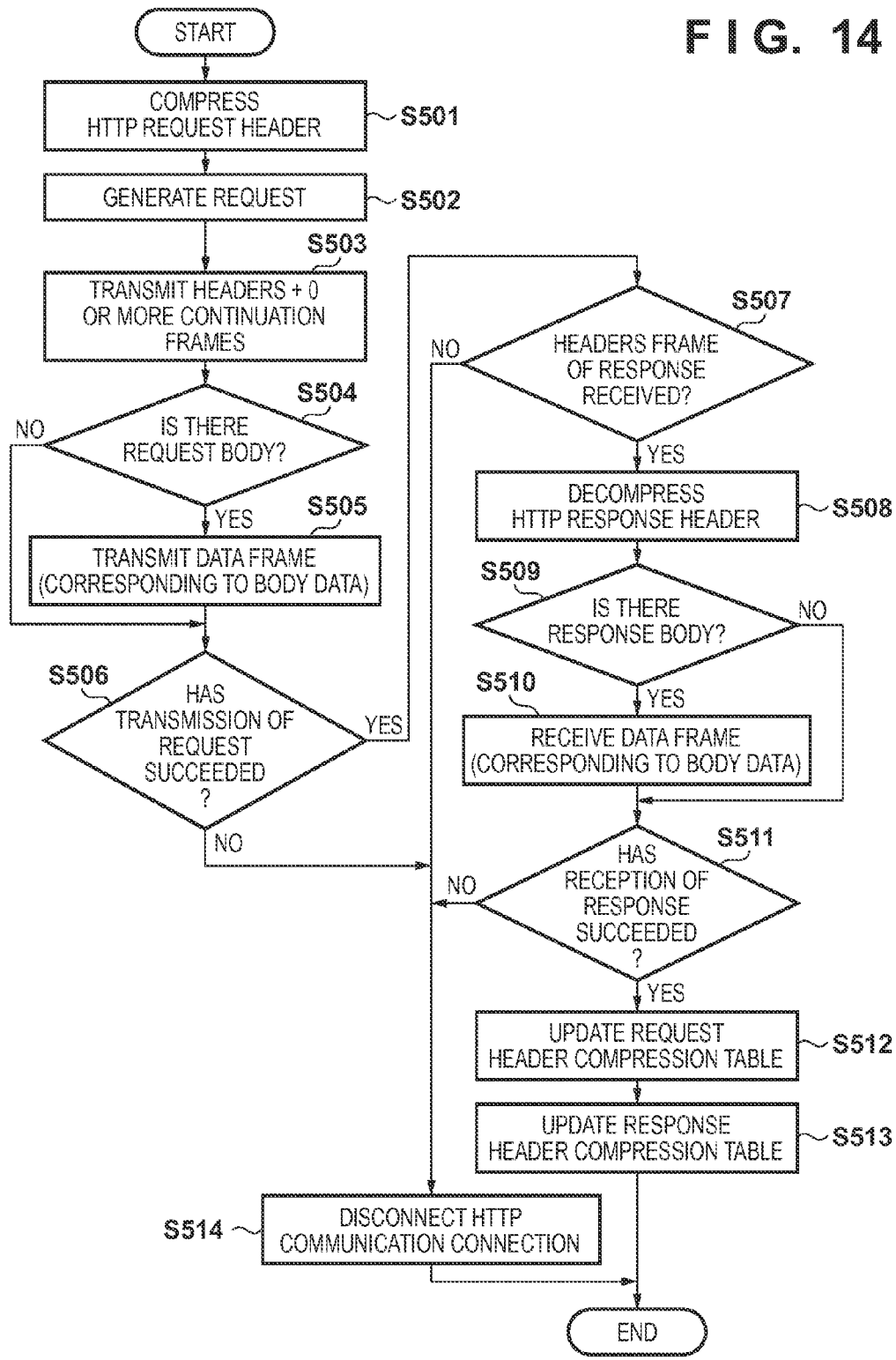

F I G. 16

REQUEST HEADER COMPRESSION TABLE (Req TABLE)   410

| Index | Header Name | Header Value |
|---|---|---|
| 0 | :scheme | http |
| ... | ... | ... |
| 37 | warning | |

RESPONSE HEADER COMPRESSION TABLE (Res TABLE)   420

| Index | Header Name | Header Value |
|---|---|---|
| 0 | :status | 200 |
| ... | ... | ... |
| 34 | www-authenticate | |

400

F I G. 17A

```
:method=GET
:scheme=https
:host=example.org
:path:/my-example/index.html
user-agent:my-user-agent
x-my-header:first
x-my-header-2:first-2
```

F I G. 17B

```
:method=GET
:scheme=https
:host=example.org
:path:/my-example/index.html
user-agent:my-user-agent
x-my-header:first
x-my-header-2:first-2
```

F I G. 17C

```
:method=GET
:scheme=https
:host=example.org
:path:/my-example/resources/script.js    ~-2031
user-agent:my-user-agent
x-my-header:second                       ~-2032
x-my-header-2:first-3
```

F I G. 17D

```
:method=GET
:scheme=https
:host=example.org
:path:/my-example/resources/script.js
user-agent:my-user-agent
x-my-header:second
x-my-header-2:first-3
```

FIG. 18A

| Index | Header Name | Header Value |
|---|---|---|
| 0 | :scheme | http |
| ... | ... | ... |
| 37 | warning | |
| 38 | :path | /my-example/index.html |
| 39 | user-agent | my-user-agent |
| 40 | x-my-header | first |
| 41 | x-my-header-2 | first-2 |

FIG. 18B

| Index | Header Name | Header Value |
|---|---|---|
| 0 | :scheme | http |
| ... | ... | ... |
| 37 | warning | |
| 38 | :path | /my-example/resources/script.js |
| 39 | user-agent | my-user-agent |
| 40 | x-my-header | second |
| 41 | x-my-header-2 | first-3 |

FIG. 19

| Header Name | Header Value |
|---|---|
| :method | GET |
| :scheme | https |
| :host | example.org |
| :path | /my-example/index.html |
| :path | /my-example/resources/script.js |
| user-agent | my-user-agent |
| x-my-header | first |
| x-my-header | second |
| x-my-header-2 | first-2 |
| x-my-header-2 | first-3 |

COMMUNICATION APPARATUS AND METHOD THEREOF

BACKGROUND OF THE INVENTION

Field of the Invention

The present invention relates to message communication.

Description of the Related Art

HTTP (HyperText Transfer Protocol) is one of protocols widely used as Internet standard techniques in general. In IETF® (Internet Engineering Task Force), a new version HTTP/2 of the HTTP standard is now being stipulated (see http://www.ietf.org/id/draft-ietf-httpbis-http2-13.txt (Jun. 17, 2014)).

A new function of HTTP/2 is an HTTP header compression function. The HTTP header compression function performs data compression of HTTP header information using a kind of dictionary called a header compression table, and transmits/receives only a difference in HTTP header information between a server and a client (see http://www.ietf.org/id/draft-ietf-httpbis-header-compression-08.txt (Jun. 6, 2014)). This reduces the data size of an HTTP communication message transmitted/received between a server and a client.

However, in the HTTP header compression function, generation of a header compression table depends on implementation of an apparatus. If the integrity of the header compression table is lost between communication apparatuses, a communication error may be generated. A demand has arisen for measures for determining the integrity of a function of generating a header compression table in each apparatus.

SUMMARY OF THE INVENTION

In one aspect, a communication apparatus comprising: a generation unit configured to generate a first table used for compression of a message to be transmitted to another communication apparatus and decompression of a compressed message received from the other communication apparatus, wherein the first table associates an index with data; an update unit configured to update the first table based on data contained in a message to be transmitted to the other communication apparatus after the first table is generated by the generation unit; a guide unit configured to guide the other communication apparatus to transmit a predetermined message corresponding to a specific index in the first table by the other communication apparatus; and a determination unit configured to determine integrity of the first table updated by the update unit and a second table used in the other communication apparatus by referring to the predetermined message received from the other communication apparatus, wherein the second table is used for compression of a message to be transmitted to the communication apparatus and decompression of a compressed message received from the communication apparatus in the other communication apparatus.

According to the aspect, the integrity between generation functions for tables used for compression of a message and decompression of a compressed message can be determined.

Further features of the present invention will become apparent from the following description of exemplary embodiments with reference to the attached drawings.

BRIEF DESCRIPTION OF THE DRAWINGS

FIG. 4 is a sequence chart for explaining an outline of a communication sequence between communication apparatuses.

FIG. 5 is a sequence chart for explaining establishment of HTTP communication connection.

FIG. 6 is a sequence chart for explaining transmission/reception of a request and dummy response.

FIG. 14 is a flowchart for explaining procedures to transmit a request and receive a response by the communication apparatus.

FIG. 16 is a table showing an example of an initial header compression table.

FIGS. 17A to 17D are views showing an example of requests by the HTTP/2 scheme that are described in the HTML file of a dummy response.

FIGS. 18A and 18B are tables showing an example of the update state of the Req table of the communication apparatus when transmitting and receiving the requests shown in FIGS. 17A to 17D.

FIG. 19 is a table showing an example of a verification pair table for determining the integrity of the header compression table generation function.

DESCRIPTION OF THE EMBODIMENTS

An information processing apparatus and information processing method for implementing a communication apparatus according to embodiments of the present invention will be described below in detail with reference to the accompanying drawings. Note that the following embodiments are not intended to limit the claims of the present invention, and not all the combinations of features described in the embodiments are necessarily essential to the solve of the present invention.

First Embodiment

[Apparatus Arrangement]

Figure 1:
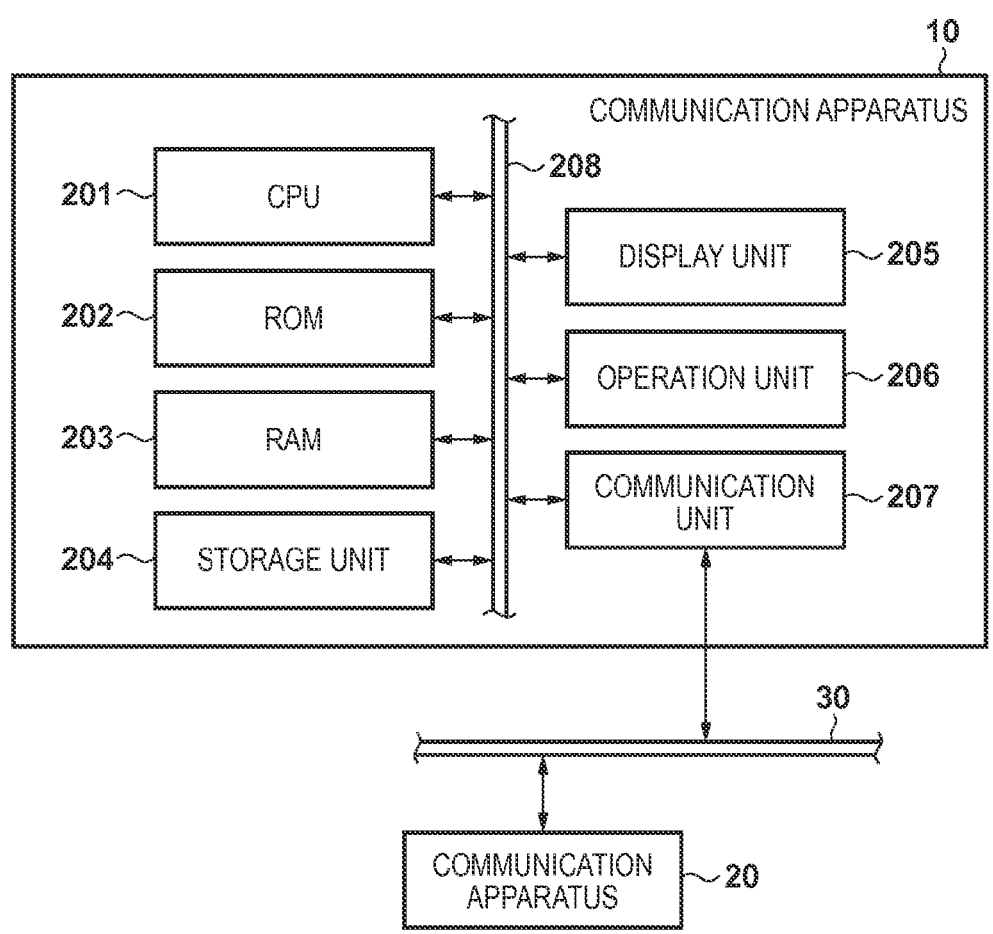
FIG. 1 is a block diagram showing the arrangement of an information processing system according to an embodiment.

The arrangement of an information processing system according to the first embodiment is shown in the block diagram of FIG. 1. A communication apparatus 10 has, for example, a wireless network communication function to comply with IEEE802.11. A communication apparatus 20, which is a communication partner of the communication apparatus 10, has the same functions and arrangement as those of the communication apparatus 10, and is connected to the communication apparatus 10 through a network 30. The communication apparatuses 10 and 20 connected with each other through the network form an information processing system.

The communication apparatuses 10 and 20 are information processing apparatuses such as a digital camera, digital video camera, mobile phone, smartphone, tablet device, personal computer, server apparatus, and the like. Note that Wi-Fi®, Bluetooth®, ZigBee®, RFID (Radio Frequency Identifier), or the like may be used as the wireless network communication function of the communication apparatuses 10 and 20. The communication is not limited to a wireless network, and may use wired network communication or a combination of wireless network communication and wired network communication.

An example in which the communication apparatuses 10 and 20 perform directly wireless network connection will be explained, but connection through a wireless access point may be performed. After the wireless network connection, the communication apparatuses 10 and 20 perform communication according to HTTP/2. Although the arrangement of the communication apparatus 10 will be described below, the communication apparatus 20 also has the same arrangement and a description of the arrangement of the communication apparatus 20 will be omitted. An example in which the two communication apparatuses 10 and 20 perform communication will be described. However, it is only necessary that the number of communication apparatuses is at least two, and the number of communication apparatuses that perform communication is not limited.

A microprocessor (CPU) 201 executes various programs stored in a read only memory (ROM) 202 and a storage unit 204 using a random access memory (RAM) 203 as a work memory, and controls an arrangement (to be described later) through a system bus 208, implementing a communication function (to be described later). The storage unit 204 is a recording medium such as a hard disk drive (HDD), solid state drive (SSD), or flash memory. The storage unit 204 stores data such as image contents and video contents in addition to programs such as an operating system (OS).

The CPU 201 displays, on a display unit 205, a graphical user interface (GUI) for allowing the user to operate the communication apparatus 10. The CPU 201 acquires a user instruction to the GUI through an operation unit 206. The CPU 201 controls a communication unit 207 to connect to the network 30 or to perform directly wireless network connection with the communication apparatus 20.

The display unit 205 is a display device such as a liquid crystal display (LCD). The operation unit 206 is a keyboard, a pointing device, various buttons, a dial, or a touch panel. When the touch panel is used as the operation unit 206 (or part of it), the touch panel and the LCD of the display unit 205 are integrally constituted.

[Functional Arrangement]

Figure 2:
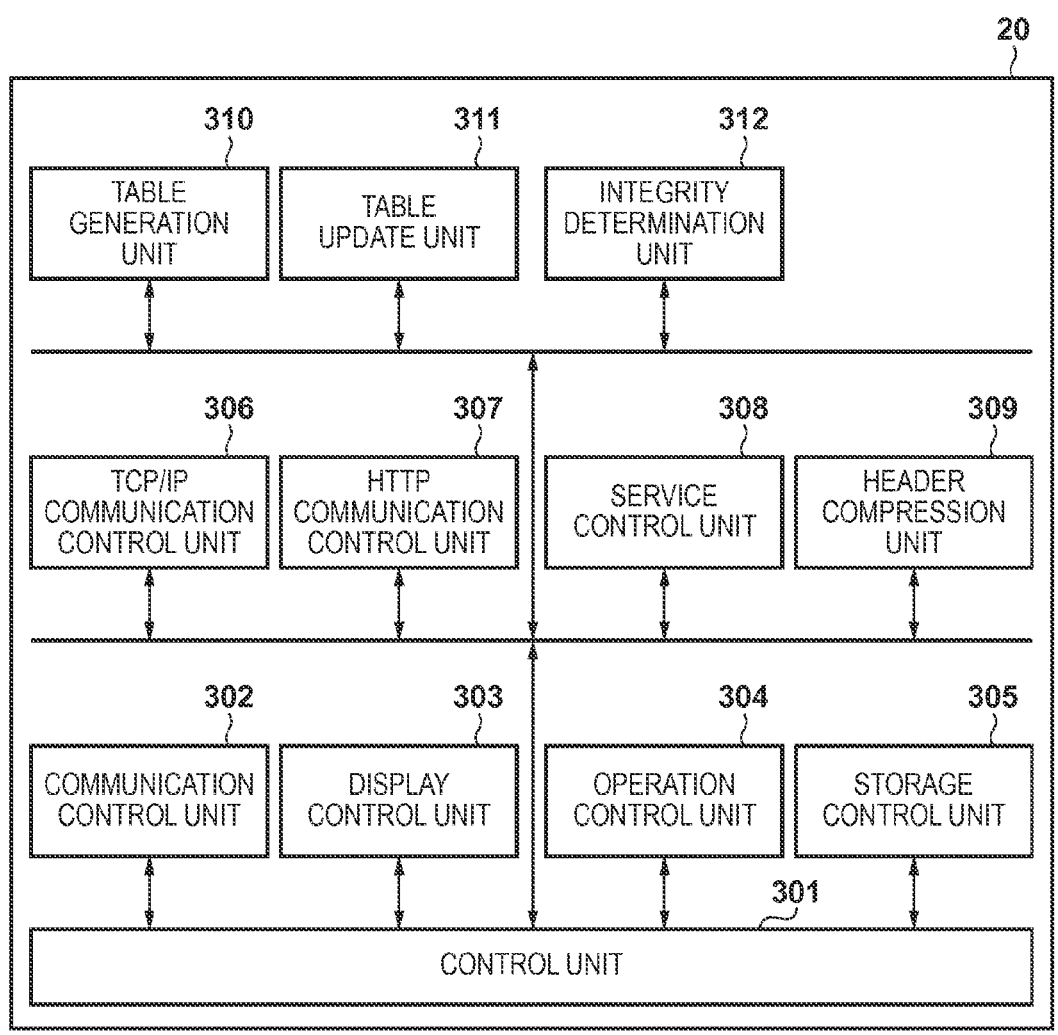
FIG. 2 is a block diagram showing the functional arrangement of a communication apparatus.

The functional arrangement of the communication apparatus 20 is shown in the block diagram of FIG. 2. FIG. 2 shows a functional arrangement when the communication apparatus 20 is a server apparatus. The functional arrangement of a client apparatus (to be referred to as a "client" hereinafter) such as the communication apparatus 10 is constituted by excluding an integrity determination unit 312 from the arrangement shown in FIG. 2.

A control unit 301 controls all the function modules of the communication apparatus 20. A communication control unit 302 controls the communication unit 207 to perform, for example, communication control of a wireless network communication scheme between the communication apparatuses 10 and 20. A display control unit 303 controls the display unit 205 to perform display control of the GUI in the communication apparatus 20.

An operation control unit 304 controls the operation unit 206 to perform control of an operation input from the user in the communication apparatus 20. A storage control unit 305 controls the RAM 203 or the storage unit 204 to store or delete processing data, or data such as image content or video content.

A TCP/IP communication control unit 306 performs communication control of the TCP/IP (Transmission Control Protocol/Internet Protocol) scheme between the communication apparatus 20 and the client using the communication control unit 302. Note that the TCP/IP communication control unit 306 performs not only TCP/IP communication, but also communication control of a scheme using UDP (User Datagram Protocol).

An HTTP communication control unit 307 performs communication control of the HTTP/2 scheme between the communication apparatus 20 and the client using the TCP/IP communication control unit 306. The HTTP communication control unit 307 also performs communication control of the HTTPS (HTTP Security) scheme using TLS (Transport Layer Security) between the communication apparatuses 10 and 20.

A service control unit 308 provides a service to the client using the HTTP communication control unit 307, or controls the use of a service provided by the client. In this embodiment, the service control unit 308 uses DLNA (Digital Living Network Alliance), UPnP (Universal Plug and Play), and a web service scheme. Note that the service schemes are not limited to them, and other service schemes are also available, including SOAP (Simple Object Access Protocol), REST (Representational State Transfer), and AtomPub (Atom Publishing protocol).

A header compression unit 309 performs compression processing/decompression processing of an HTTP header in HTTP/2 based on a header compression table. The header compression unit 309 of the client compresses an HTTP header (to be referred to as an "HTTP request header" hereinafter) in an HTTP request message generated by the HTTP communication control unit 307. Also, the header compression unit 309 of the client decompresses a compressed HTTP header in an HTTP response message received by the HTTP communication control unit 307 from the communication apparatus 20. Note that an HTTP request message will be sometimes called a "request", and an HTTP response message will be sometimes called a "response".

The header compression unit 309 of the communication apparatus 20 serving as the server apparatus compresses an HTTP header (to be referred to as an "HTTP response header" hereinafter) in a response generated by the HTTP communication control unit 307. The header compression unit 309 of the communication apparatus 20 decompresses a compressed HTTP request header in a request received by the HTTP communication control unit 307 from the communication apparatus 10.

A table generation unit 310 generates an initial header compression table defined in HTTP/2. An example of the initial header compression table in this embodiment will be described later. A table update unit 311 updates the header compression table based on an HTTP request header that has been compressed and transmitted by the header compression unit 309 and the HTTP communication control unit 307. The table update unit 311 updates the header compression table based on an HTTP response header that has been received and decompressed by the HTTP communication control unit 307 and the header compression unit 309.

The integrity determination unit 312 generates a dummy response (to be described later), and determines the integrity between the functions (to be referred to as a "header compression table generation function" hereinafter) of the header compression unit 309, table generation unit 310, and table update unit 311, and the header compression table generation function of the communication apparatus 10.

Header Compression Table

Figure 3:
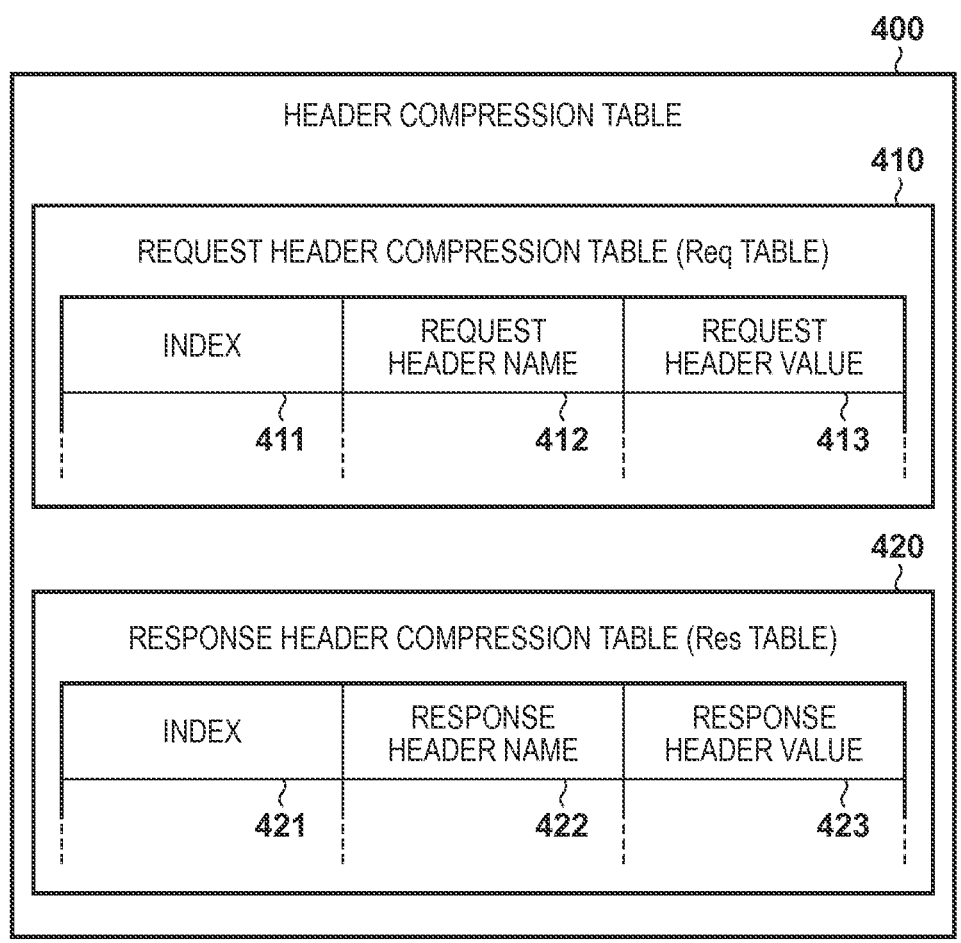
FIG. 3 is a table for explaining the structure of a header compression table.

The structure of the header compression table will be explained with reference to FIG. 3. A header compression table 400 includes a request header compression table 410 used for compression and decompression processes of an HTTP header, and a response header compression table 420 used for similar processes. In the following description, the request header compression table will be referred to as a "Req table", and the response header compression table will be referred to as a "Res table".

The Req table 410 is constituted by an index 411 indicating a record number in this table, a request header name 412, and a request header value 413. Similarly, the Res table 420 is constituted by an index 421 indicating a record number in this table, a response header name 422, and a response header value 423.

[Communication Sequence]

An outline of a communication sequence between the communication apparatuses 10 and 20 will be explained with reference to the sequence chart of FIG. 4. FIG. 4 shows an outline of a communication sequence from the start of communication between the communication apparatuses 10 and 20 after network connection to disconnection of the communication.

The communication apparatuses 10 and 20 perform establishment of HTTP communication connection (S11). After the HTTP communication connection is established, the communication apparatus 10 transmits a request. In response to this HTTP request, the communication apparatus 20 transmits a dummy response for determining the integrity of the header compression table generation function (S12). Note that details of the dummy response will be described later.

Then, the communication apparatus 10 issues a request by HTTP/2 based on an HTML file included in the received dummy response. The communication apparatus 20 determines the integrity of the header compression table generation function based on the received request (S13). Based on the integrity determination result, the communication apparatus 20 transmits, to the communication apparatus 10, a response to the request received in step S13 (S14).

The communication apparatuses 10 and 20 perform HTTP communication (transmission/reception of a request and transmission/reception of a response) by HTTP/2 (S15). After that, the communication apparatuses 10 and 20 disconnect the HTTP communication connection (S16). However, the HTTP communication by HTTP/2 in step S15 is performed when it is determined in step S13 that the integrity of the header compression table generation function is maintained.

In this manner, at the start of HTTP communication between the communication apparatuses 10 and 20, the communication apparatus 20 determines the integrity between the header compression table generation function of the communication apparatus 10 and that of the communication apparatus 20. Based on the integrity determination result, the communication apparatus 20 determines whether HTTP communication by HTTP/2 is possible. Although not shown in FIG. 4, when it is determined that HTTP communication by HTTP/2 is impossible, for example, the communication apparatuses 10 and 20 can shift to HTTP communication by HTTP/1.1.

Establishment of HTTP Communication Connection (S11)

Establishment of HTTP communication connection (S11) will be explained with reference to the sequence chart of FIG. 5. First, establishment of a TCP session (S11A) is performed between the communication apparatuses 10 and 20. The communication apparatus 10 transmits a TCP connection request (SYN frame) to the communication apparatus 20 (S111), and the communication apparatus 20 transmits a TCP connection request response (SYN/ACK frame) to the communication apparatus 10 (S112). The communication apparatus 10 transmits a response (ACK frame) to the communication apparatus 20 (S113), establishing the TCP session.

Then, establishment of a TLS session between the communication apparatuses 10 and 20 (S11B) is performed. The communication apparatus 10 transmits a list (Client Hello) of usable encryption and compression algorithms to the communication apparatus 20 (S114). The communication apparatus 20 transmits information (Server Hello) of decided encryption and compression algorithms to the communication apparatus 10 (S115).

Further, the communication apparatus 20 transmits a root certificate and a server certificate to the communication apparatus 10 (S116), and transmits server key information (S117). The communication apparatus 20 transmits a completion message (Server Hello Done) of the series of processes to the communication apparatus 10 (S118).

The communication apparatus 10 transmits key information (Pre-Master Secret) to the communication apparatus 20 (S119), and transmits a preparation completion message (Change Cipher Spec) of the encryption algorithm (S120). Thereafter, the communication apparatus 10 transmits a completion message (Finished) of key exchange and authentication processing to the communication apparatus 20 (S121).

The communication apparatus 20 transmits a preparation completion message (Change Cipher Spec) of the encryption algorithm to the communication apparatus 10 (S122), and transmits a success message (Finished) of key exchange and authentication processing (S123), thereby establishing the TLS session. After the TCP session and the TLS session are established, HTTP communication connection is performed.

Transmission/Reception of Request and Dummy Response (S12)

Transmission/reception of a request and dummy response (S12) will be explained with reference to the sequence chart of FIG. 6. The communication apparatus 10 generates the new header compression table 400 (S131), generates a request, and compresses an HTTP request header using the Req table 410 (S132). The communication apparatus 10 updates the Req table 410 based on the generated HTTP request header (S133).

The communication apparatus 10 transmits the request to the communication apparatus 20 by HTTP/2 (S134). The transmission of the request (S134) is constituted by transmission of the following frames:

step S134*a*: transmission of HEADERS+0 or more CONTINUATION frames representing an HTTP request line and an HTTP request header, step S134*b*: transmission of a DATA frame representing a request body, and step S134*c*: transmission of a final DATA frame to which an END_STREAM flag is added.

Upon receiving the request, the communication apparatus 20 newly generates the header compression table 400 (S135), and updates the Req table 410 based on the HTTP request header of the received request (S136). The communication apparatus 20 generates a dummy response to the received request, and compresses an HTTP response header using the Res table 420 (S137). The communication apparatus 20 updates the Res table 420 based on the generated HTTP response header (S138).

If the communication apparatus 20 receives a request from the communication apparatus 10 for the first time, or if it detects a syntax error from the request of the communication apparatus 10, it generates a dummy response. The dummy response for determining the integrity of the header compression table generation function includes an HTML file describing a plurality of requests to be transmitted to the communication apparatus 10 after the communication apparatus 10 is caused to start new HTTP communication.

This request includes information for allowing the communication apparatus 20 to discriminate a request for determining the integrity of the header compression table generation function, details of which will be described later. The request including information indicating a request for determining the integrity of the header compression table generation function is sometimes called an "integrity determination request".

Then, the communication apparatus 20 transmits the dummy response to the communication apparatus 10 by HTTP/2 (S139). The transmission of the dummy request (S139) is constituted by transmission of the following frames:

step S139*a*: transmission of a HEADERS frame representing an HTTP status line and an HTTP response header, step S139*b*: transmission of a DATA frame representing a dummy request body, and step S139*c*: transmission of a final DATA frame to which an END_STREAM flag is added.

Upon receiving the dummy response, the communication apparatus 10 updates the Res table 420 based on the HTTP response header of the dummy response (S140).

Determination of Integrity of Header Compression Table Generation Function (S13)

Figure 7A:
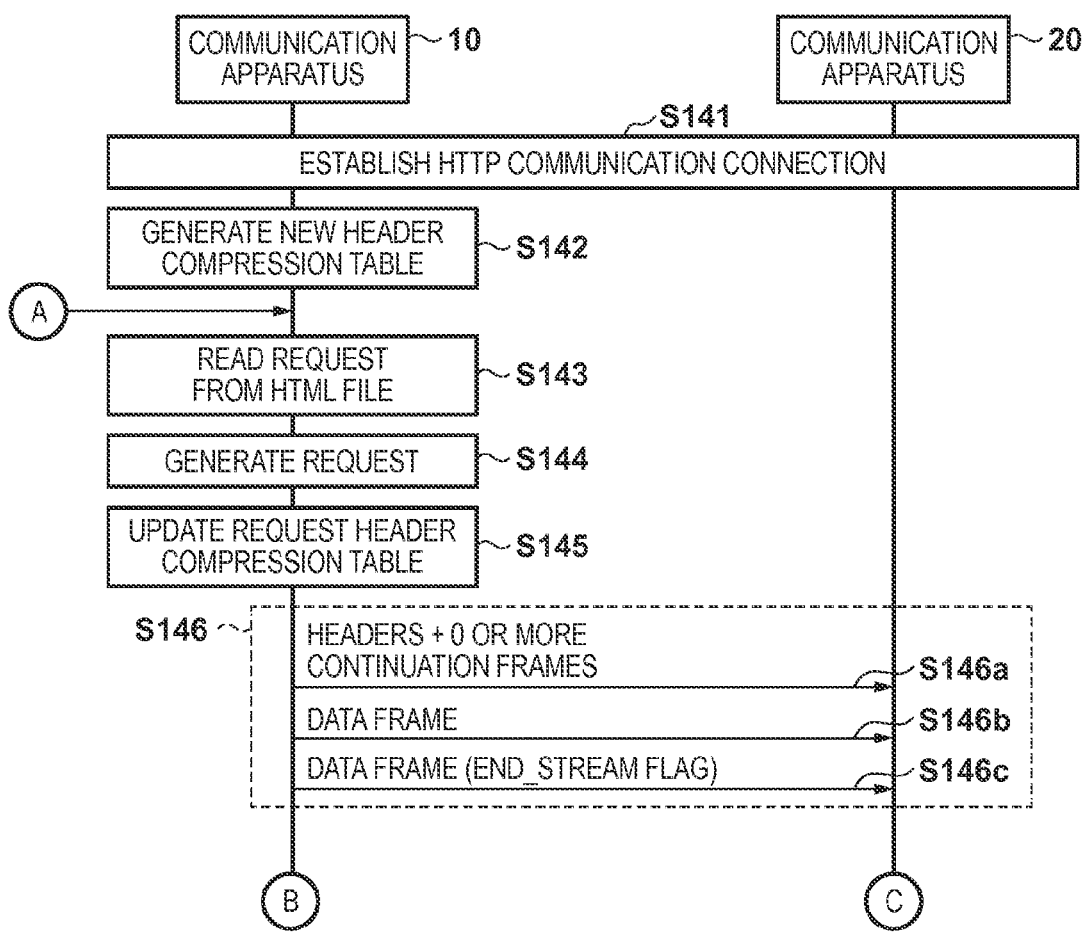
FIGS. 7A and 7B are sequence charts for explaining determination of the integrity of a header compression table generation function.
Figure 7B:
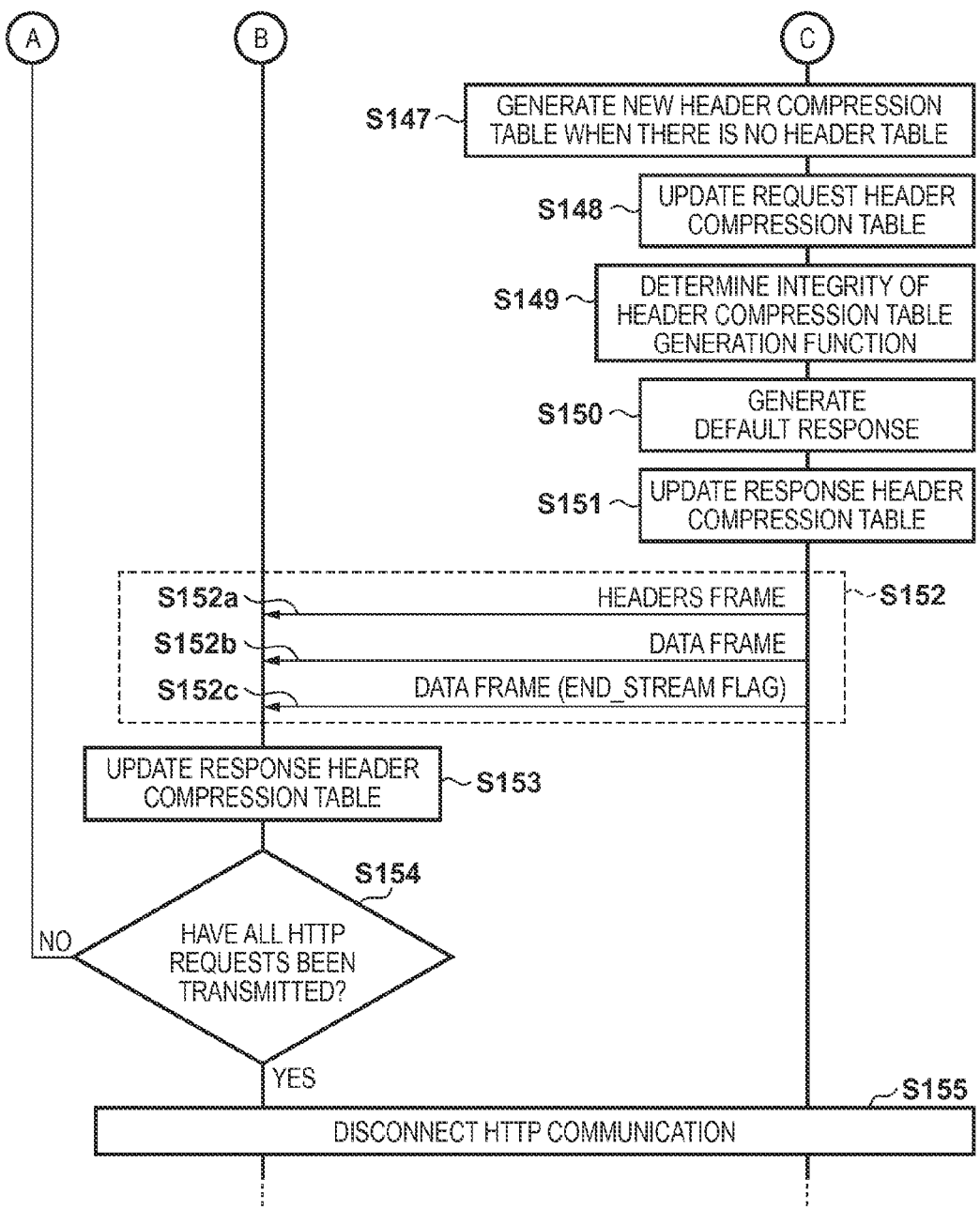

Determination of the integrity of the header compression table generation function (S13) will be explained with reference to the sequence charts of FIGS. 7A and 7B. The communication apparatus 10 establishes new HTTP communication connection between the communication apparatuses 10 and 20 in accordance with an HTML file included in the dummy response, in order to start new HTTP communication and transmit a request (S141). The communication apparatus 10 generates the new header compression table 400 (S142).

Then, the following processing is repeated until the communication apparatus 10 transmits all requests described in the HTML file included in the dummy response. The communication apparatus 10 reads requests of one line that are described in the HTML file included in the dummy response (S143). The communication apparatus 10 generates, from the read request, a request (integrity determination request) to be transmitted to the communication apparatus 20, and compresses the HTTP request header using the Req table 410 (S144).

The communication apparatus 10 updates the Req table 410 based on the generated HTTP request header (S145). The communication apparatus 10 transmits the request to the communication apparatus 20 by HTTP/2 (S146). The transmission of the request (S146) is the same as the processing of step S134 shown in FIG. 6, and a detailed description thereof will not be repeated.

Upon receiving the request, the communication apparatus 20 generates the new header compression table 400 at the start of new HTTP communication in which the header compression table 400 does not exist (S147). The communication apparatus 20 updates the Req table 410 based on the HTTP request header of the received request (S148).

In this case, the request received by the communication apparatus 20 is the integrity determination request. From the structure of the updated Req table 410, the communication apparatus 20 determines the integrity between the header compression table generation function of the communication apparatus 10 and that of the communication apparatus 20 (S149). Details of the determination of the integrity will be described later.

The communication apparatus 20 generates a default response representing normal processing with respect to the received integrity determination request, and compresses the HTTP response header using the Res table 420 (S150). The communication apparatus 20 updates the Res table 420 based on the generated HTTP response header (S151). After that, the communication apparatus 20 transmits the response to the communication apparatus 10 by HTTP/2 (S152). The transmission of the response (S152) is the same as the processing of step S139 shown in FIG. 6, and a detailed description thereof will not be repeated.

Upon receiving the response, the communication apparatus 10 updates the Res table 420 based on the response header of the response (S153). The communication apparatus 10 determines whether all requests described in the HTML file included in the dummy response have been transmitted (S154). If an untransmitted request remains, the process is returned to step S143. If transmission of all the requests is completed, the communication apparatus 10 disconnects the HTTP communication connection between the communication apparatuses 10 and 20 that has been established in step S141 (S155).

Transmission of Response Based on Determination Result (S14)

Transmission of a response based on the determination result (S14) will be explained with reference to the sequence chart of FIG. 8. The communication apparatus 20 determines the integrity between the header compression table generation function of the communication apparatus 10 and that of the communication apparatus 20. If it is determined that the integrity is maintained, step S14A is executed. If it is determined that the integrity is lost, step S14B is executed.

If it is determined that the integrity is maintained (S14A), the communication apparatus 20 generates a response corresponding to the request received in step S134, and compresses the HTTP response header using the Res table 420

(S161). The communication apparatus 20 updates the Res table 420 based on the generated HTTP response header (S162). The Res table 420 used here is the Res table 420 of the header compression table 400 that has been generated in step S135. The communication apparatus 20 transmits the response to the communication apparatus 10 by HTTP/2 (S163). The transmission of the response (S163) is the same as the processing of step S139 shown in FIG. 6, and a detailed description thereof will not be repeated.

If it is determined that the integrity is lost (S14B), the communication apparatus 20 notifies the communication apparatus 10 of an error, and ends the communication by HTTP/2. That is, the communication apparatus 20 transmits a RST_STREAM frame in HTTP/2 to the communication apparatus 10 (S164), and transmits a GOAWAY frame in HTTP/2 to the communication apparatus 10 (S165).

HTTP Communication by HTTP/2 (S15)

Figure 9:
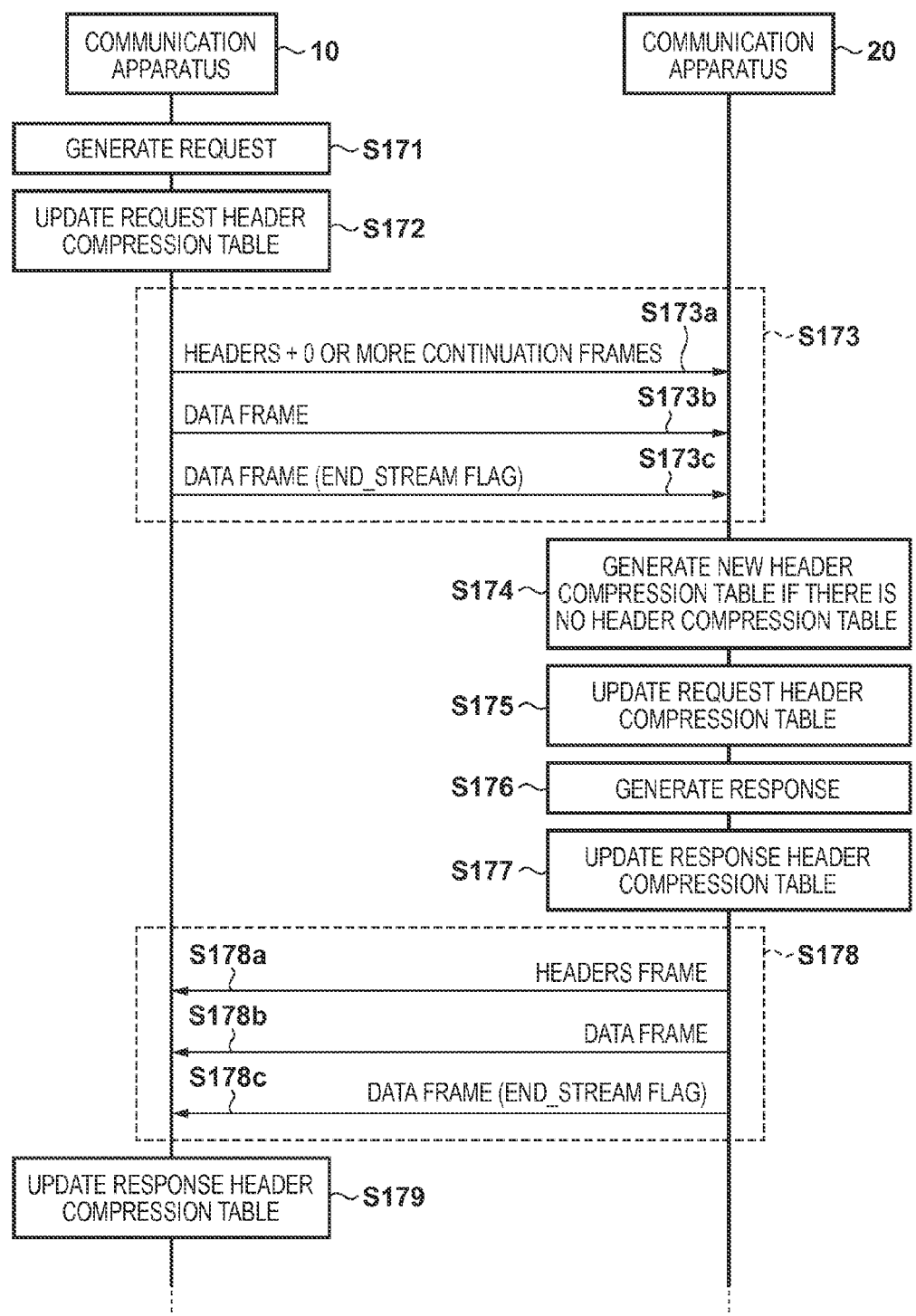
FIG. 9 is a sequence chart for explaining HTTP communication by HTTP/2.

HTTP communication by HTTP/2 (S15) will be explained with reference to the sequence chart of FIG. 9. The communication apparatus 10 generates a request, and compresses an HTTP request header using the Req table 410 (S171). The communication apparatus 10 updates the Req table 410 based on the generated HTTP request header (S172). The Req table 410 used here is the Req table 410 of the header compression table 400 that has been generated in step S131. The communication apparatus 10 transmits the request to the communication apparatus 20 by HTTP/2 (S173). The transmission of the request (S173) is the same as the processing of step S134 shown in FIG. 6, and a detailed description thereof will not be repeated.

Upon receiving the request, the communication apparatus 20 generates the new header compression table 400 at the start of new HTTP communication in which the header compression table 400 does not exist (S174). The communication apparatus 20 updates the Req table 410 based on the HTTP request header of the received request (S175). The communication apparatus 20 generates a response to the received request, and compresses the HTTP response header using the Res table 420 (S176). The communication apparatus 20 updates the Res table 420 based on the generated HTTP response header (S177).

The communication apparatus 20 transmits the response to the communication apparatus 10 by HTTP/2 (S178). The transmission of the response (S178) is the same as the processing of step S139 shown in FIG. 6, and a detailed description thereof will not be repeated. Upon receiving the response, the communication apparatus 10 updates the Res table 420 based on the HTTP response header of the response (S179).

Disconnection of HTTP Communication Connection (S16)

Figure 10:
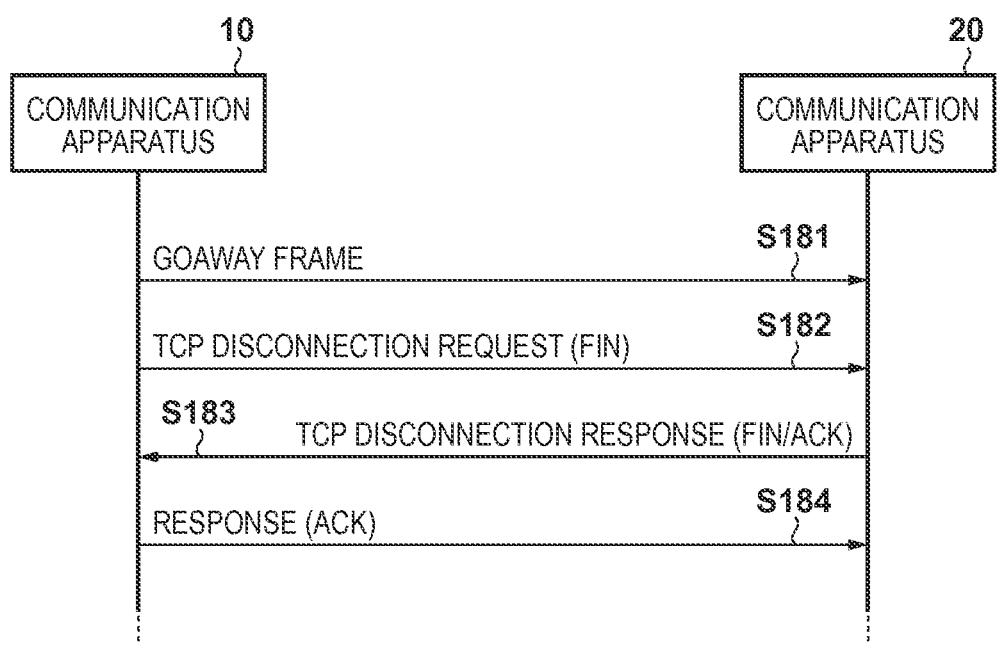
FIG. 10 is a sequence chart for explaining disconnection of HTTP communication connection.

Disconnection of HTTP communication connection (S16) will be explained with reference to the sequence chart of FIG. 10. The communication apparatus 10 transmits a GOAWAY frame in HTTP/2 to the communication apparatus 20 (S181). The communication apparatus 10 transmits a TCP disconnection request (FIN frame) to the communication apparatus 20 in order to disconnect the TCP session between the communication apparatuses 10 and 20 (S182). Upon receiving the TCP disconnection request, the communication apparatus 20 transmits a TCP disconnection request response (FIN/ACK frame) to the communication apparatus 10 (S183). The communication apparatus 10 transmits a response (ACK frame) to the communication apparatus 20 (S183). As a result, the HTTP communication connection is disconnected.

Processing Upon Receiving Error Notification

Figure 11:
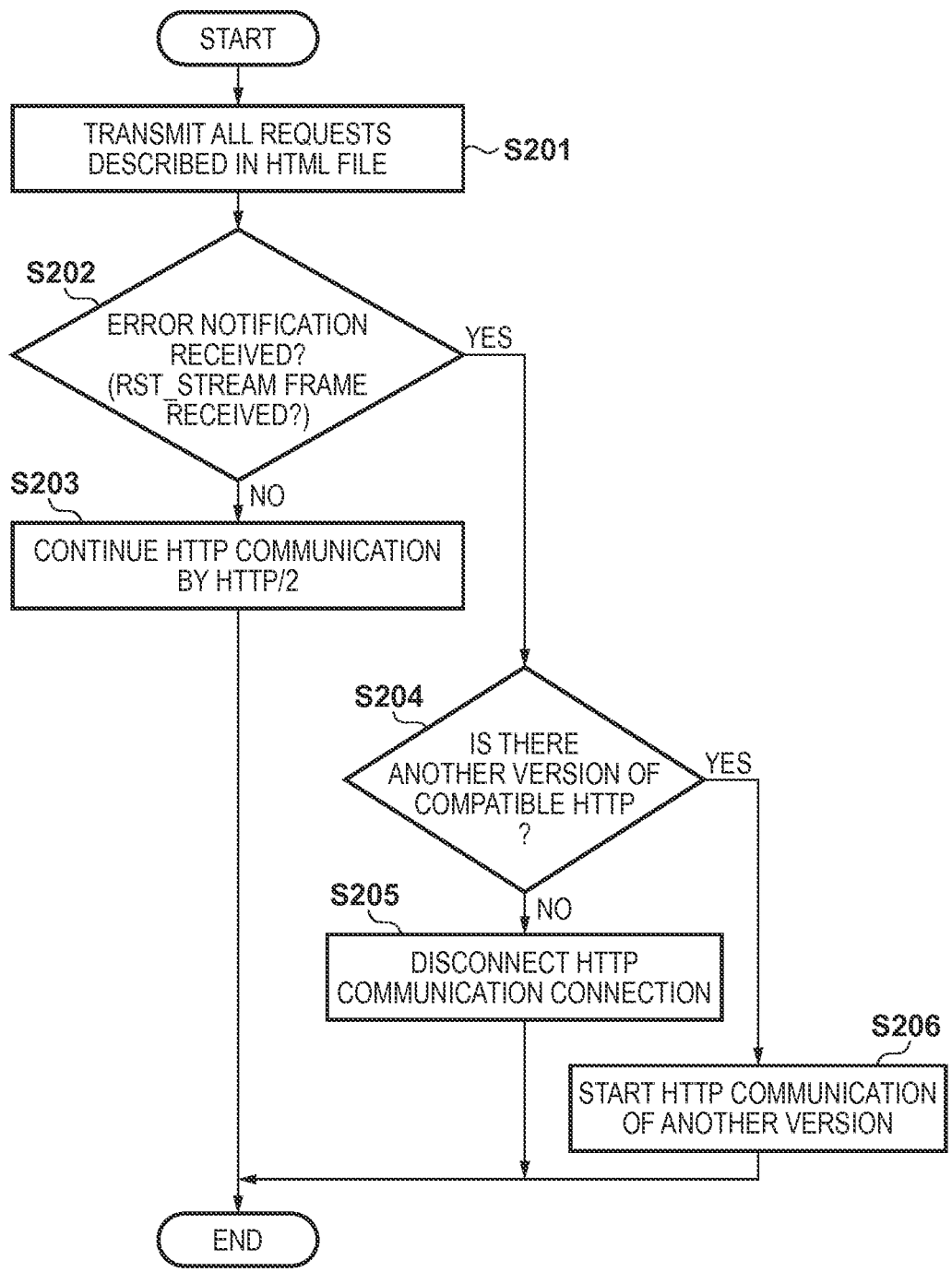
FIG. 11 is a flowchart for explaining processing by the communication apparatus upon receiving an error notification.

Processing by the communication apparatus 10 upon receiving an error notification will be explained with reference to the flowchart of FIG. 11. That is, processing by the communication apparatus 10 when it is determined that the integrity of the header compression table generation function is lost will be described.

As described above, the HTTP communication control unit 307 of the communication apparatus 10 transmits all requests described in an HTML file included in a dummy response (S201). The HTTP communication control unit 307 determines whether it has received a RST_STREAM frame from the communication apparatus 20 (S202). If the RST_STREAM frame has been received, the process is advanced to step S204. If the RST_STREAM frame has not been received, the HTTP communication control unit 307 determines that the integrity of the header compression table generation function is maintained and the request and response by HTTP/2 are normally processed, and continues the HTTP communication by HTTP/2 (S203).

If the RST_STREAM frame has been received, the HTTP communication control unit 307 determines that the integrity of the header compression table generation function is lost, and determines whether there is a compatible HTTP version, in addition to HTTP/2 (S204). Since HTTP/1.1 is generally compatible, the HTTP communication control unit 307 starts HTTP communication by HTTP/1.1 (S206). If there is no other version, the HTTP communication control unit 307 disconnects the HTTP communication connection (S205).

Determination of Integrity of Header Compression Table Generation Function

Processing of determining the integrity of the header compression table generation function will be explained with reference to the flowchart of FIG. 12. An example in which updating of the Req table 410 uses only incremental indexing will be explained. The communication apparatus 20 repeats processes in steps S302 to S311 by the number of requests described in the HTML file included in the dummy response.

The HTTP communication control unit 307 receives a request from the communication apparatus 10 by HTTP/2 (S302). The reception processing of the request (S302) will be explained with reference to part of the flowchart of FIG. 15. The HTTP communication control unit 307 determines whether HEADERS+0 or more CONTINUATION frames have been received (S601). If the frame has been received, the table generation unit 310 generates the new header compression table 400 (S602).

Then, the header compression unit 309 decompresses a compressed HTTP request header included in the received HEADERS+0 or more CONTINUATION frames using the Res table 420 (S603). The HTTP communication control unit 307 determines whether the received request has a request body (S604).

If the request has a request body, the HTTP communication control unit 307 receives a DATA frame (S605). The DATA frame includes information of the request body. The HTTP communication control unit 307 repeats the reception of the DATA frame (S605) by the number of times corresponding to the size of the request body data.

Then, the integrity determination unit 312 determines whether the request (to be referred to as a "received request" hereinafter) received in step S302 uses incremental indexing for updating of the header compression table (S303). If incremental indexing is used, the process is advanced to step S304. If incremental indexing is not used, the process is advanced to step S307.

If incremental indexing is used, the table update unit 311 updates the Req table 410 based on the incremental indexing instruction of the HTTP request header of the received request (S304). The integrity determination unit 312 compares a pair of the request header name 412 and request header value 413 of the updated Req table 410 with a pair of a request header name and request header value held for determining integrity (S305). In the following description, the pair in the Req table 410 will be sometimes called a "table pair", and the pair for determining integrity will be sometimes called a "verification pair". Details of the verification pair will be described later.

The integrity determination unit 312 determines whether the comparison result in step S305 represents a match between the table pair and the verification pair (S306). If the comparison result represents a match, the process is advanced to step S307. If the comparison result does not represent a match, the process is advanced to step S310.

If incremental indexing is not used, or if the table pair and the verification pair match each other, the integrity determination unit 312 determines whether the received request uses the index (to be referred to as a "table index" hereinafter) of the header compression table (S307). If the table index is used, the process is advanced to step S308. If no table index is used, the process is advanced to step S311.

If the table index is used, the header compression unit 309 decompresses, using the Req table 410, a compressed HTTP request header included in the HEADERS+0 or more CONTINUATION frames of the received request (S308). The integrity determination unit 312 determines whether the structure of the decompressed HTTP request header matches the request described in the HTML file included in the dummy response (S309). If the header structure and the request match each other, the process is advanced to step S311. If the header structure and the request do not match each other, the process is advanced to step S310.

If the table pair and the verification pair do not match each other, or the header structure and the request do not match each other, the integrity determination unit 312 determines that the header compression table generation function of the communication apparatus 10 and that of the communication apparatus 20 do not have integrity (S310).

Thereafter, the integrity determination unit 312 transmits a default response to the received request (S311). The transmission processing of the response (S311) will be explained with reference to part of the flowchart of FIG. 15. The header compression unit 309 compresses the HTTP response header using the Res table 420 (S607). The HTTP communication control unit 307 generates a response including the compressed HTTP response header (S608), and transmits a HEADERS frame to the communication apparatus 10 (S609). The HEADERS frame includes information of the compressed HTTP response header.

The HTTP communication control unit 307 determines whether the generated response has a response body (S610). If the generated response has a response body, the HTTP communication control unit 307 transmits a DATA frame to the communication apparatus 10 (S611). The DATA frame includes the information of the response body generated in step S608. The HTTP communication control unit 307 repeats the transmission of the DATA frame (S611) by the number of times corresponding to the size of the response body data, and sets an END_STREAM flag in a final DATA frame.

Note that a default response transmitted in step S311 is a default response for determining the header compression table generation function. Since the determination of the header compression table generation function is performed using the Req table 410, the use of the Res table 420 is arbitrary.

After that, the integrity determination unit 312 determines whether it has been detected that the header compression table generation function of the communication apparatus 10 and that of the communication apparatus 20 do not have integrity (S312). If it has been detected that the integrity is lost, the process is advanced to step S313. If it has been detected that the integrity is maintained, the process is advanced to step S315.

If the integrity is lost, the integrity determination unit 312 causes the HTTP communication control unit 307 to notify the communication apparatus 10 of a communication error by HTTP/2 (S313), and disconnects the HTTP communication connection by HTTP/2 between the communication apparatuses 10 and 20 (S314).

If the integrity is maintained, the integrity determination unit 312 transmits an authentic response to the request received (S146) by the communication apparatus 20 from the communication apparatus 10 upon transmitting a dummy response from the HTTP communication control unit 307 (S315).

Another processing of determining the integrity of the header compression table generation function will be explained with reference to the flowcharts of FIGS. 13A and 13B. The processing in FIGS. 13A and 13B is different from that shown in FIG. 12 in that replacement indexing is used for updating of the Req table 410, in addition to incremental indexing. The same reference numerals as those in FIG. 12 denote the same processes except for processing regarding this point, and a description thereof will not be repeated. The communication apparatus 20 repeats the processes in steps S302 to S311 by the number of requests described in the HTML file included in the dummy response.

The integrity determination unit 312 determines whether the received request uses replacement indexing for updating of the header compression table (S321). If replacement indexing is used, the process is advanced to step S322. If replacement indexing is not used, the process is advanced to step S307.

If replacement indexing is used, the table update unit 311 updates the Req table 410 based on the replacement indexing instruction of the HTTP request header of the received request (S322). The integrity determination unit 312 compares a table pair of the request header name 412 and request header value 413 of the updated Req table 410 with a verification pair of a request header name and request header value (S323).

The integrity determination unit 312 determines whether the comparison result in step S323 represents a match between the table pair and the verification pair (S324). If the comparison result represents a match, the process is advanced to step S307. If the comparison result does not represent a match, the process is advanced to step S310. Subsequent processes are the same as those in FIG. 12.

Transmission of Request and Reception of Response

Procedures to transmit a request and receive a response by the communication apparatus 10 will be explained with reference to the flowchart of FIG. 14. The header compression unit 309 compresses an HTTP request header using the header compression table (S501).

The HTTP communication control unit 307 generates a request including the compressed HTTP request header (S502), and transmits HEADERS+0 or more CONTINUA- TION frames to the communication apparatus 20 (S503). This frame includes information of the HTTP request header compressed in step S501.

The HTTP communication control unit 307 determines whether the generated request includes a request body (S504). If the generated request includes a request body, the HTTP communication control unit 307 transmits a DATA frame to the communication apparatus 20 (S505). This frame includes information of the request body generated in step S502. The HTTP communication control unit 307 repeats the transmission of the DATA frame by the number of times corresponding to the size of the request body data, and sets an END_STREAM flag in a final DATA frame.

The HTTP communication control unit 307 then determines whether the transmission of the request to the communication apparatus 20 has succeeded (S506). If the transmission of the request has failed, the HTTP communication control unit 307 disconnects the HTTP communication connection with the communication apparatus 20 (S514), and ends the process.

If the transmission of the request has succeeded, the HTTP communication control unit 307 determines whether the HEADERS frame of the response has been received from the communication apparatus 20 (S507). If no HEADERS frame has been received even upon the lapse of a predetermined time, the HTTP communication control unit 307 disconnects the HTTP communication connection with the communication apparatus 20 (S514), and ends the process.

If the HEADERS frame has been received, the header compression unit 309 decompresses a compressed HTTP response header included in the received HEADERS frame using the header compression table (S508). The HTTP communication control unit 307 determines whether the received response has a response body (S509). If the received response has a response body, the HTTP communication control unit 307 receives a DATA frame from the communication apparatus 20 (S510). This frame includes information of the response body. The HTTP communication control unit 307 repeats the reception of the DATA frame by the number of times corresponding to the size of the response body data.

The HTTP communication control unit 307 determines whether the reception of the response from the communication apparatus 20 has succeeded (S511). If the reception of the response has failed, the HTTP communication control unit 307 disconnects the HTTP communication connection with the communication apparatus 20 (S514), and ends the process.

If the reception of the response has succeeded, the table update unit 311 updates the Req table 410 based on the HTTP request header generated in steps S501 and S502 (S512). Further, the table update unit 311 updates the Res table 420 based on the HTTP response header received in step S507 (S513), and ends the process.

Reception of Request and Transmission of Response

Figure 15:
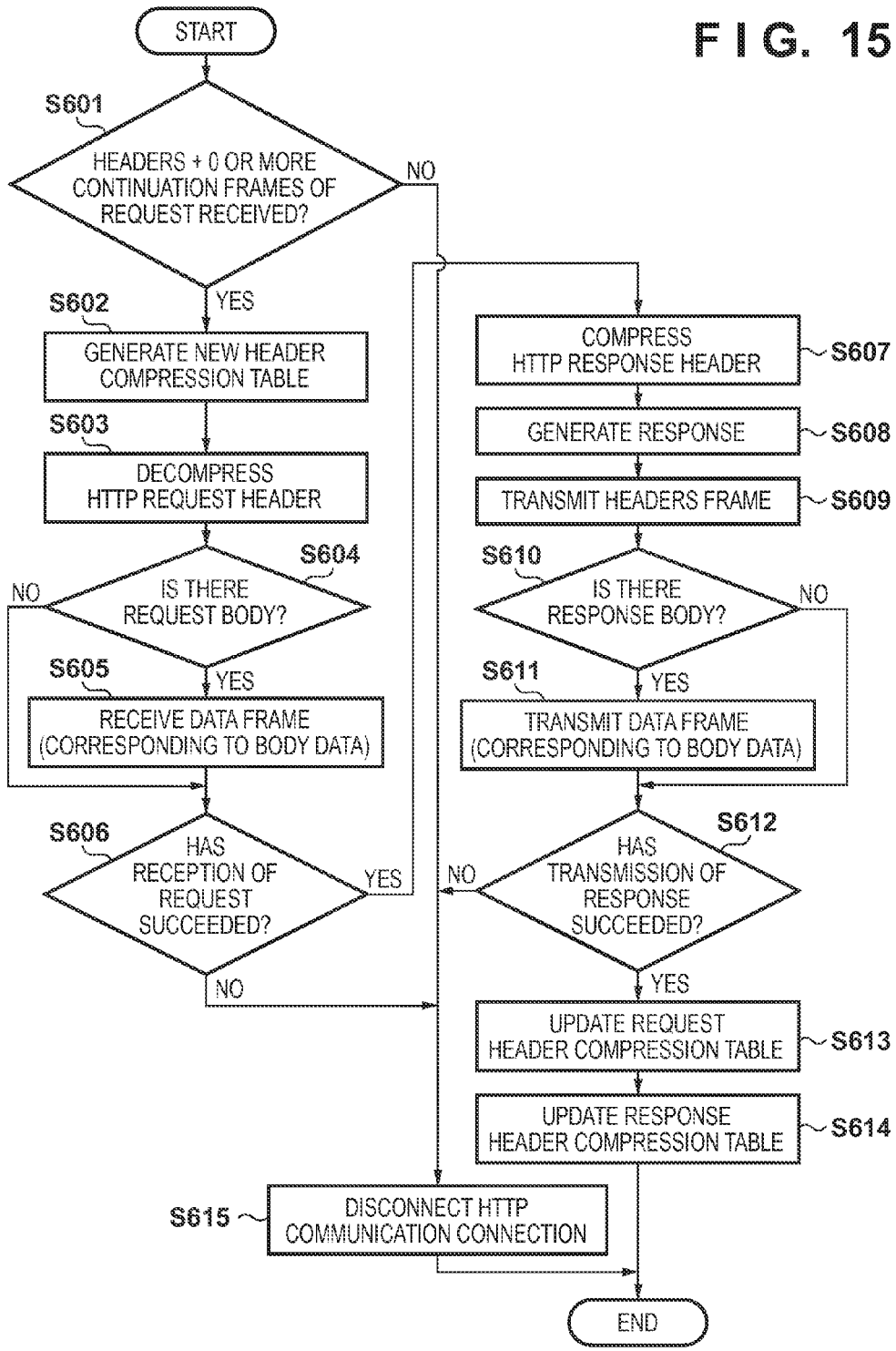
FIG. 15 is a flowchart for explaining procedures to receive a request and transmit a response by the communication apparatus.

Procedures to receive a request and transmit a response by the communication apparatus 20 will be explained with reference to the flowchart of FIG. 15. The HTTP communication control unit 307 determines whether the HEADERS+0 or more CONTINUATION frames of a request have been received (S601). If the HEADERS+0 or more CONTINUATION frames have not been received even upon the lapse of a predetermined time, the HTTP communication control unit 307 disconnects the HTTP communication connection with the communication apparatus 10 (S615), and ends the process.

If the HEADERS+0 or more CONTINUATION frames have been received, the table generation unit 310 generates a new header compression table (S602). The header compression unit 309 decompresses a compressed HTTP request header included in the received HEADERS+0 or more CONTINUATION frames using the header compression table (S603).

Then, the HTTP communication control unit 307 determines whether the received request has a request body (S604). If the request has a request body, the HTTP communication control unit 307 receives a DATA frame from the communication apparatus 10 (S605). This frame includes information of the request body. The HTTP communication control unit 307 repeats the reception of the DATA frame by the number of times corresponding to the size of the request body data.

The HTTP communication control unit 307 determines whether the reception of the request from the communication apparatus 10 has succeeded (S606). If the reception of the request has failed, the HTTP communication control unit 307 disconnects the HTTP communication connection with the communication apparatus 10 (S615), and ends the process.

If the reception of the request has succeeded, the header compression unit 309 compresses an HTTP response header using the header compression table (S607). The HTTP communication control unit 307 generates a response including the compressed HTTP response header (S608), and transmits a HEADERS frame to the communication apparatus 10 (S609). This frame includes information of the compressed HTTP response header.

The HTTP communication control unit 307 determines whether the generated response includes a response body (S610). If the generated response includes a response body, the HTTP communication control unit 307 transmits a DATA frame to the communication apparatus 10 (S611). This frame includes information of the response body generated in step S608. The HTTP communication control unit 307 repeats the transmission of the DATA frame by the number of times corresponding to the size of the response body data, and sets an END_STREAM flag in a final DATA frame.

The HTTP communication control unit 307 determines whether the transmission of the response to the communication apparatus 10 has succeeded (S612). If the transmission of the response has failed, the HTTP communication control unit 307 disconnects the HTTP communication connection with the communication apparatus 10 (S615), and ends the process.

If the transmission of the response has succeeded, the table update unit 311 updates the Req table 410 based on the HTTP request header received in step S601 (S613). Further, the Res table 420 is updated based on the HTTP response header generated in steps S607 and S608 (S614), and the process ends.

Initial Header Compression Table

FIG. 16 shows an example of the initial header compression table 400. In the Req table 410, HTTP request header names and HTTP request header values with indices of 0 to 37 are set as initial records. Similarly, in the Res table 420, HTTP response header names and HTTP response header values with indices of 0 to 34 are set as initial records.

FIGS. 17A to 17D show an example of requests by the HTTP/2 scheme that are described in the HTML file of a dummy response. The communication apparatus 10 receives the HTML file describing the requests in FIGS. 17A to 17D in ascending order, and transmits the requests to the communication apparatus 20 in the order of description in FIGS. 17A to 17D.

The request shown in FIG. 17A and the request shown in FIG. 17B have the same contents. When transmitting the request in FIG. 17A, the communication apparatus 10 generates the header compression table 400 and updates it by incremental indexing. When transmitting the request in FIG. 17B, the communication apparatus 10 executes header compression using the indices of the header compression table 400 updated at the time of transmitting the request in FIG. 17A.

The request shown in FIG. 17C and the request shown in FIG. 17D have the same contents. When transmitting the request in FIG. 17C, the communication apparatus 10 updates the header compression table 400 by incremental indexing or replacement indexing in regard to headers 2031 and 2032 of this request. When transmitting the request in FIG. 17D, the communication apparatus 10 executes header compression using the indices of the header compression table 400 updated at the time of transmitting the request in FIG. 17C.

The communication apparatus 20 determines the integrity between the request received from the communication apparatus 10 and the request described in the HTML file of the dummy response, thereby determining the integrity of the header compression table generation function. The communication apparatus 20 determines the following two items.

The first determination item is a combination of an HTTP request header name and HTTP request header value. It is determined whether the combination of the HTTP request header name and HTTP request header value in the header compression table 400 generated and updated based on the request of the communication apparatus 10 has integrity with the request described in the HTML file of the dummy response. At this time, the determination is performed using a verification pair table.

The second determination item is the correspondence of an index added to a combination of an HTTP request header name and HTTP request header value. When a request using an index is received from the communication apparatus 10, the HTTP request header is decompressed based on the header compression table 400 that has been generated and updated by the communication apparatus 20 based on the request of the communication apparatus 10. It is determined whether the combination of the decompressed HTTP request header name and HTTP request header value has integrity with the request described in the HTML file of the dummy response. That is, the integrity between the index addition method of the communication apparatus 10 and that of the communication apparatus 20 is determined.

FIGS. 18A and 18B show the update state of the Req table of the communication apparatus 10 when transmitting and receiving the requests shown in FIGS. 17A to 17D. A Req table 410a in FIG. 18A is an example of a Req table updated by the communication apparatus 10 at the time of transmitting the request shown in FIG. 17A. The Req table 410a includes the following records, in addition to the initial records with indices of 0 to 37:

| Index | HTTP Request Header Name | Header Value |
| --- | --- | --- |
| 38 | :path | /my-example/index.html |
| 39 | :user-agent | my-user-agent |
| 40 | :x-my-header | first |
| 41 | :x-my-header-2 | first-2 |

A Req table 410b in FIG. 18B is an example of a Req table updated by the communication apparatus 10 at the time of transmitting the request shown in FIG. 17C. In the Req table 410b, the following records are updated with respect to the Req table 410a shown in FIG. 18A:

| Index | HTTP Request Header Name | Header Value |
| --- | --- | --- |
| 38 | :path | /my-example/resources/script.js |
| 40 | :x-my-header | second |
| 41 | :x-my-header-2 | first-3 |

FIG. 19 shows an example of the verification pair table for determining the integrity of the header compression table generation function. The verification pair table is a table in which all combinations each of an HTTP request header name and HTTP request header value included in a request described in the HTML file of a dummy response are extracted. Upon receiving a request from the communication apparatus 10, the communication apparatus 20 compares an HTTP request header name and HTTP request header value (table pair) included in this request with a verification pair shown in FIG. 19, and determines the integrity between these pairs.

In this fashion, the integrity determination unit 312 of the communication apparatus 20 functions as a guide unit that guides the communication apparatus 10 to transmit a predetermined message (request) corresponding to specific indices (indices of 38, 40, and 41 in the example of FIG. 18B) of the Req table 410a updated by the communication apparatus 10 in accordance with a request described in the HTML file of a dummy response.

The integrity determination unit 312 determines whether the request described in the HTML file of the dummy response is restored by sequentially updating the Req table 410b of the communication apparatus 20 in accordance with responses sequentially received from the communication apparatus 10. That is, the integrity determination unit 312 functions as a determination unit that, when the request is restored, determines that the header compression table generation function has integrity, and when the request is not restored, determines that the header compression table generation function does not have integrity.

In other words, the integrity determination unit 312 serving as the guide unit refers to indices included in a predetermined message transmitted by the communication apparatus 10, and determines the integrity between the updated header compression table and the header compression table used in the communication apparatus 10.

In this manner, upon receiving a first request from the communication apparatus 10, the communication apparatus 20 transmits a dummy response, determines the integrity between the header compression table generation function of the communication apparatus 10 and that of the communication apparatus 20, and determines the validity of header compression using the header compression table. Hence, a communication error arising from a mismatch of the header compression table can be detected, and highly reliable communication becomes possible.

As shown in FIG. 6, when the communication apparatus 20 ends the HTTP communication connection sequence with the communication apparatus 10 and receives a request from the communication apparatus 10, it transmits a dummy response for determining the header compression table generation function. Thus, the communication apparatus 10 transmits a request described in an HTML file included in the received dummy response, as shown in FIGS. 7A and 7B. As a result, the communication apparatus 20 can determine the integrity between the header compression table generation function of the communication apparatus 10 and that of the communication apparatus 20. Generation of a communication error arising from a mismatch of the header compression table can be detected before the start of actual communication.

Figure 8:
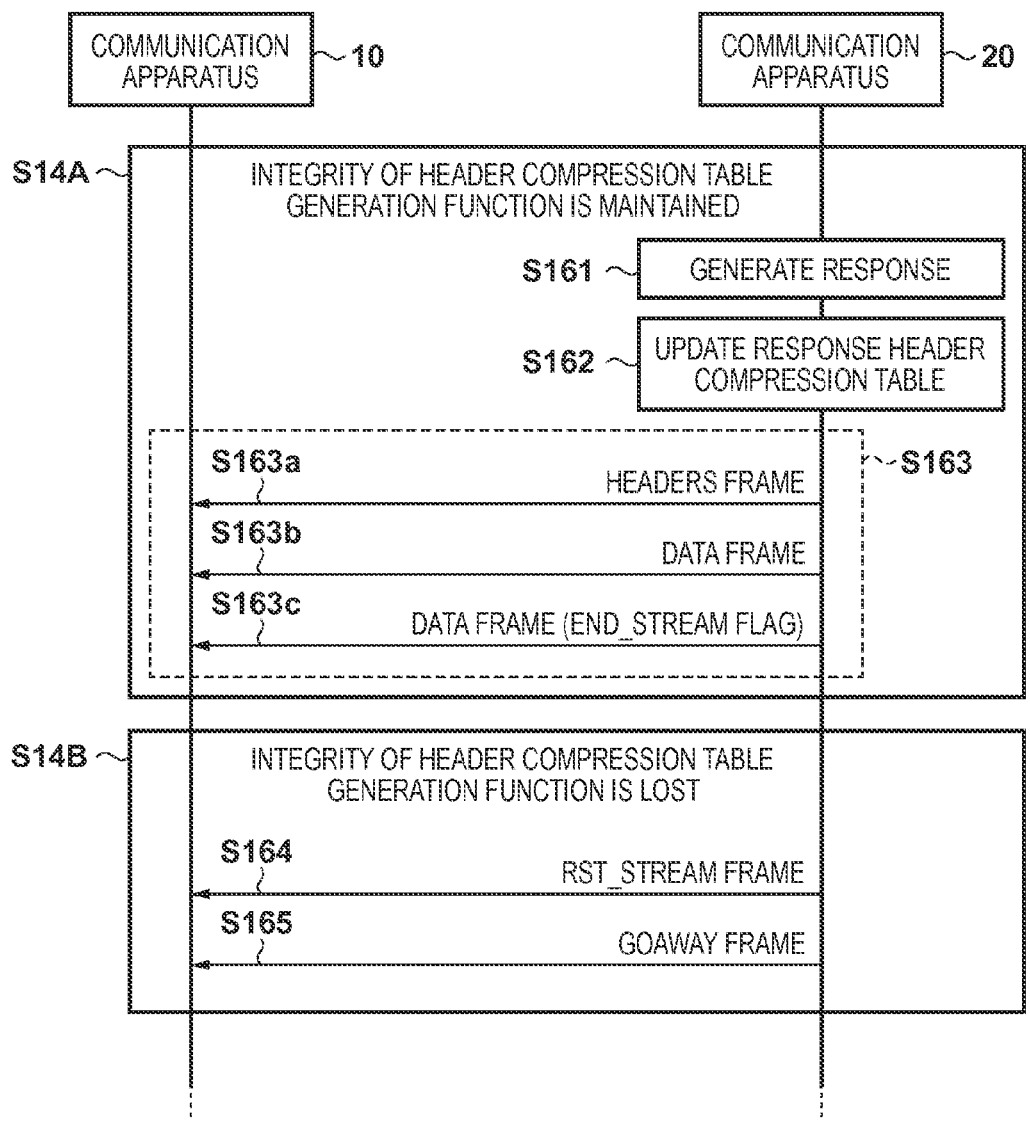
FIG. 8 is a sequence chart for explaining transmission of a response based on the determination result.

As shown in FIG. 8, when the communication apparatus 20 determines that the header compression table generation function of the communication apparatus 10 and that of the communication apparatus 20 have integrity, it transmits a normal response to the request that has transmitted the dummy response. As a result, the communication apparatus 20 can execute determination of the header compression table generation function based on the normal request from the communication apparatus 10 before the start of actual communication. This can obviate the necessity to mount the integrity determination unit 312 in the communication apparatus 10. By only mounting the integrity determination unit 312 in the communication apparatus 20, the header compression table generation function of the communication apparatus 10 can be determined.

In contrast, as shown in FIG. 8, when the communication apparatus 20 determines that the header compression table generation function of the communication apparatus 10 and that of the communication apparatus 20 do not have integrity, it notifies the communication apparatus 10 of an error, and ends communication by the HTTP/2 scheme. Accordingly, as shown in FIG. 11, the communication apparatus 10 can determine that communication by the HTTP/2 scheme is impossible, and switch the communication scheme to another one. Generation of a communication error arising from a mismatch of the header compression table can be detected before the start of actual communication. The processing load and communication delay caused by the communication error in actual communication can be reduced, and smooth switching to the communication scheme can be performed.

Figure 12:
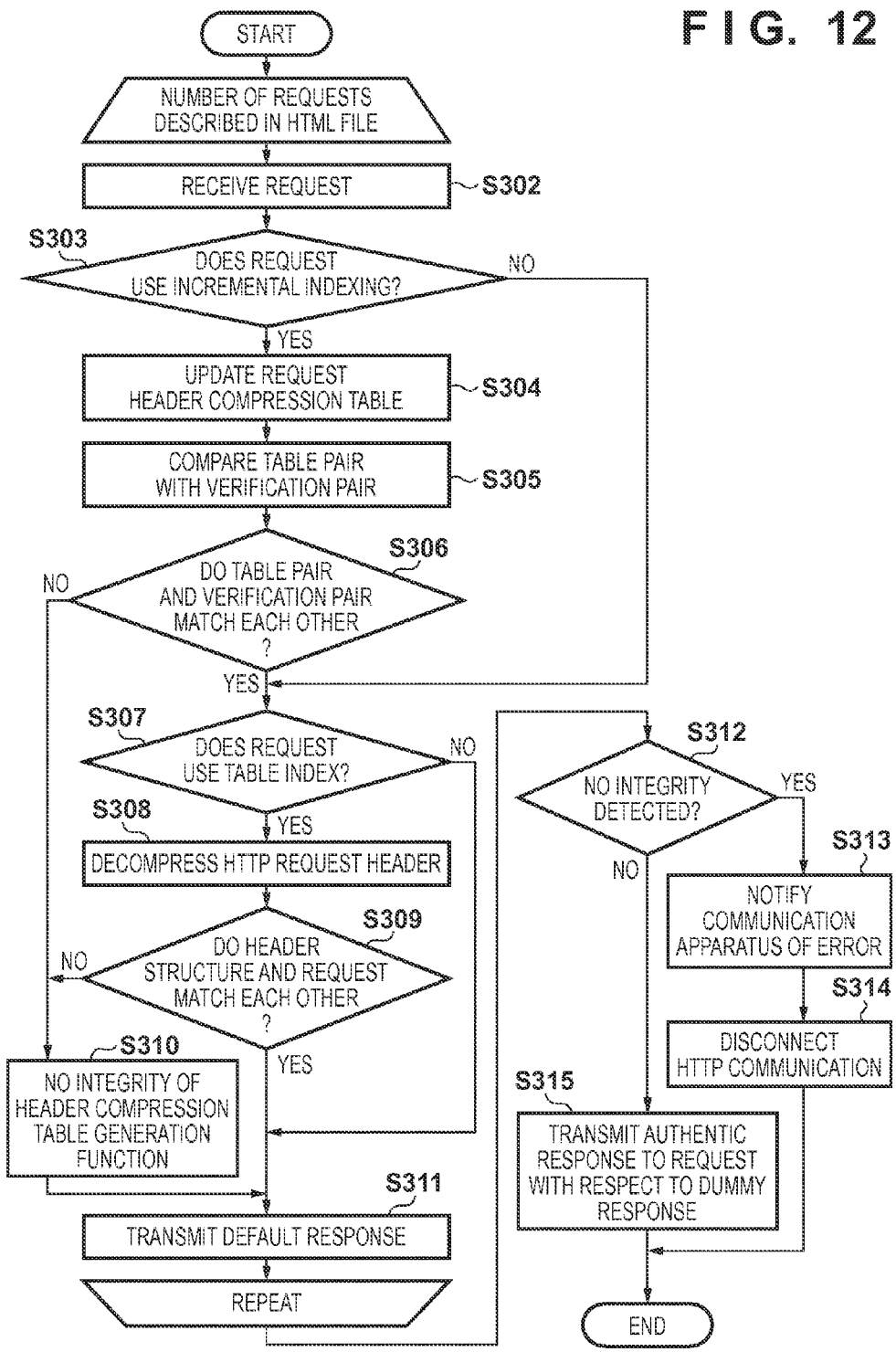
FIG. 12 is a flowchart for explaining processing of determining the integrity of the header compression table generation function.
Figure 13A:
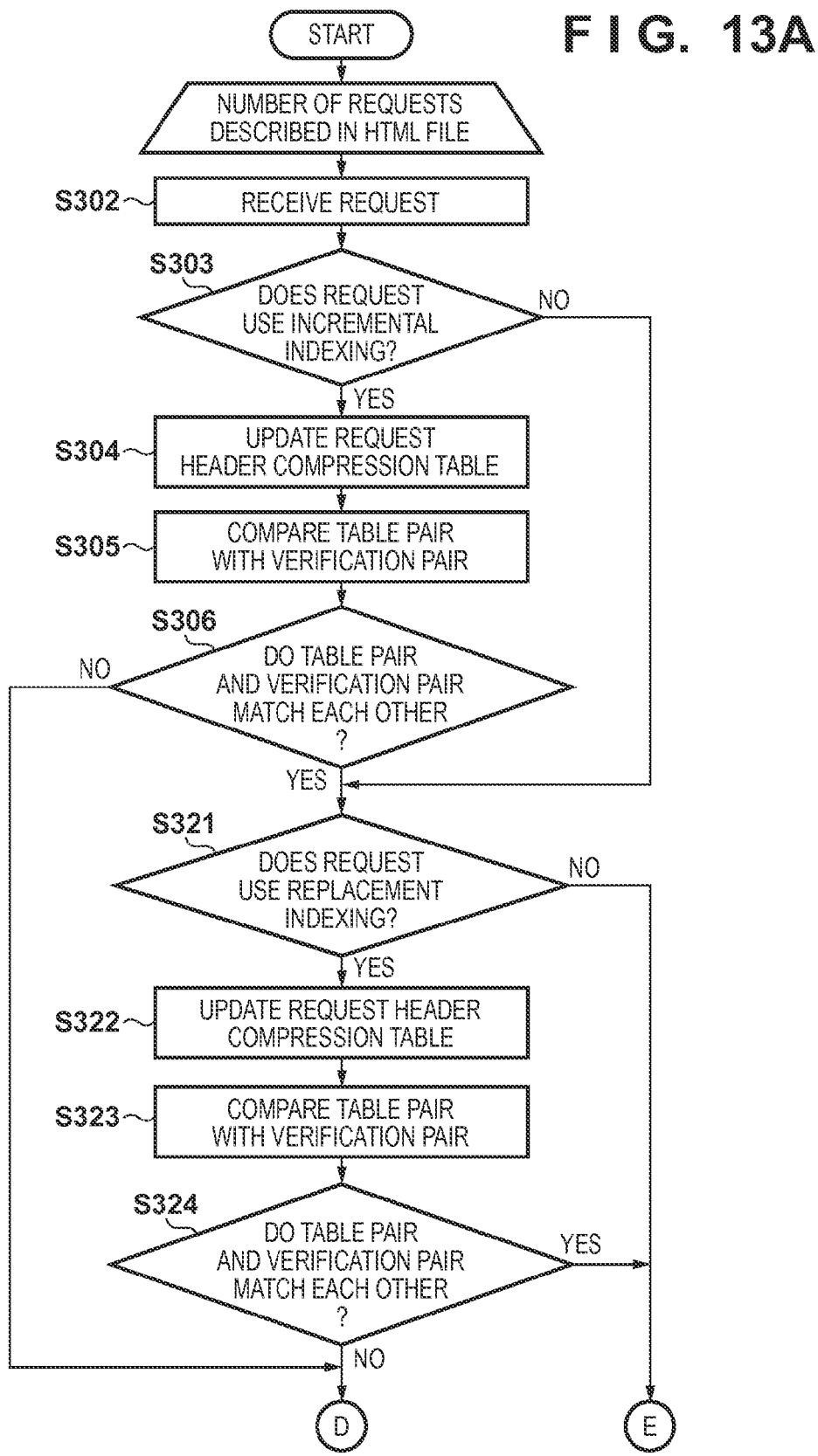
FIGS. 13A and 13B are flowcharts for explaining another processing of determining the integrity of the header compression table generation function.
Figure 13B:
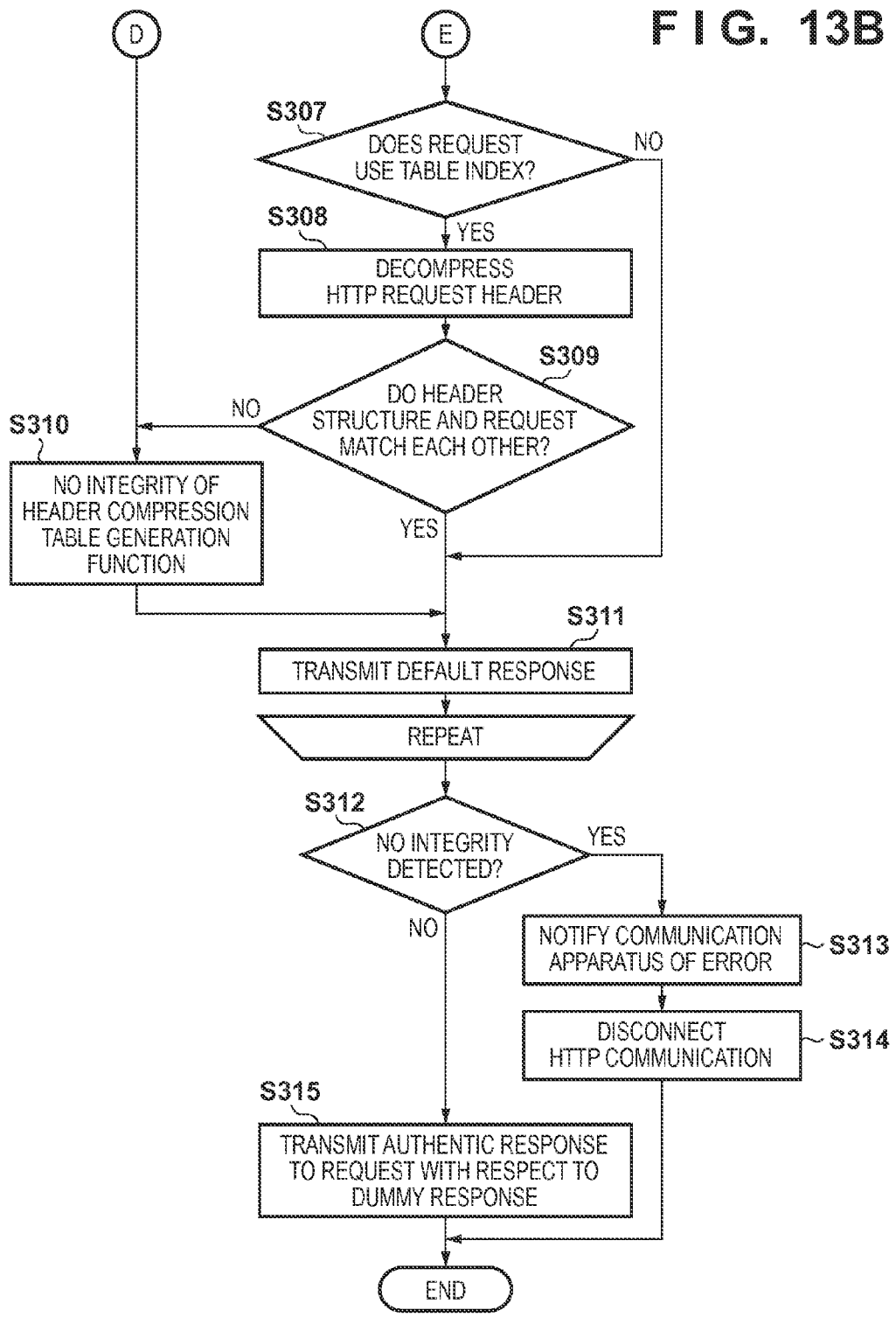

In other words, the integrity determination unit 312 of the communication apparatus 20 functions as a notification unit that notifies the communication apparatus 10 of a message corresponding to the determination result of the integrity of the header compression table generation function, as represented by steps S313 and S315 of FIG. 12.

Modification of Embodiment

In the above description, the integrity determination unit 312 determines the integrity of the header compression table generation function after the end of the HTTP communication connection sequence. However, the present invention is not limited to this. When an abnormality is detected in the operation of the communication apparatus 10, for example, when the communication apparatus 10 repetitively transmits the same request, the integrity determination unit 312 may determine the integrity of the header compression table generation function. When an abnormality such as a syntax error is detected in a request of the communication apparatus 10 using the HTTP communication control unit 307, the integrity determination unit 312 can also determine the header compression table generation function (this example will be explained in the second embodiment).

The integrity determination unit 312 may function as an invalidation unit that validates at least some records in the updated header compression table 400 in accordance with the determination result of the integrity of the header compression table generation function. Some records to be invalidated are records in the updated header compression table 400 that correspond to indices at which requests described in the HTML file of a dummy response have not been restored.

Second Embodiment

An information processing apparatus and information processing method according to the second embodiment of the present invention will be described below. In the second embodiment, the same reference numerals as those in the first embodiment denote the same parts, and a detailed description thereof will not be repeated.

Figure 20:
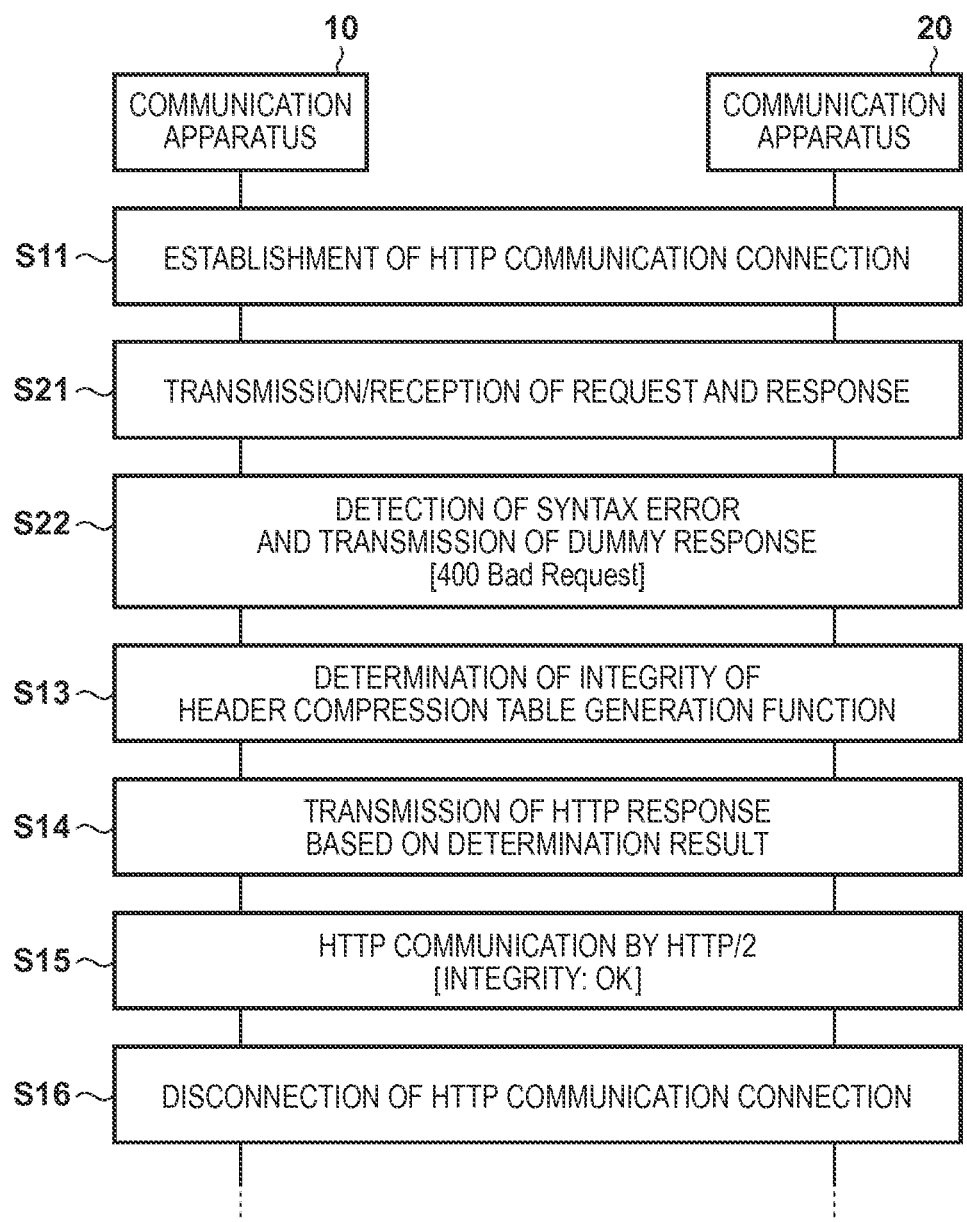
FIG. 20 is a sequence chart for explaining an outline of a communication sequence between communication apparatuses according to the second embodiment.

An outline of a communication sequence between communication apparatuses 10 and 20 according to the second embodiment will be explained with reference to the sequence chart of FIG. 20. FIG. 20 shows an outline of a communication sequence from the start of communication between the communication apparatuses 10 and 20 after network connection to disconnection of the communication.

In the second embodiment, after establishment of HTTP communication connection (S11), an HTTP communication control unit 307 of the communication apparatus 20 performs communication (transmission/reception of a request/response) with the communication apparatus 10 (S21). If a request syntax error generated during communication is detected (S22), whether the HTTP communication by the HTTP/2 scheme can be continued is determined based on determination of the integrity of the header compression table generation function (S13).

When sending back a response "400 Bad Request" representing the request syntax error with respect to the request of the communication apparatus 10, an integrity determination unit 312 of the communication apparatus 20 transmits a dummy response for determining the integrity of the header compression table generation function (S22). If the integrity determination unit 312 detects a mismatch of the header compression table generation function, the HTTP communication control unit 307 of the communication apparatus 20 determines that the syntax error of the request received from the communication apparatus 10 arises from the mismatch of the header compression table generation function, and ends the communication. To the contrary, if the integrity determination unit 312 detects no mismatch of the header compression table generation function, the HTTP communication control unit 307 of the communication apparatus 20 determines that the syntax error of the request received from the communication apparatus 10 arises from a cause other than the header compression table generation function, and demands the communication apparatus 10 to retransmit the request.

Figure 21:
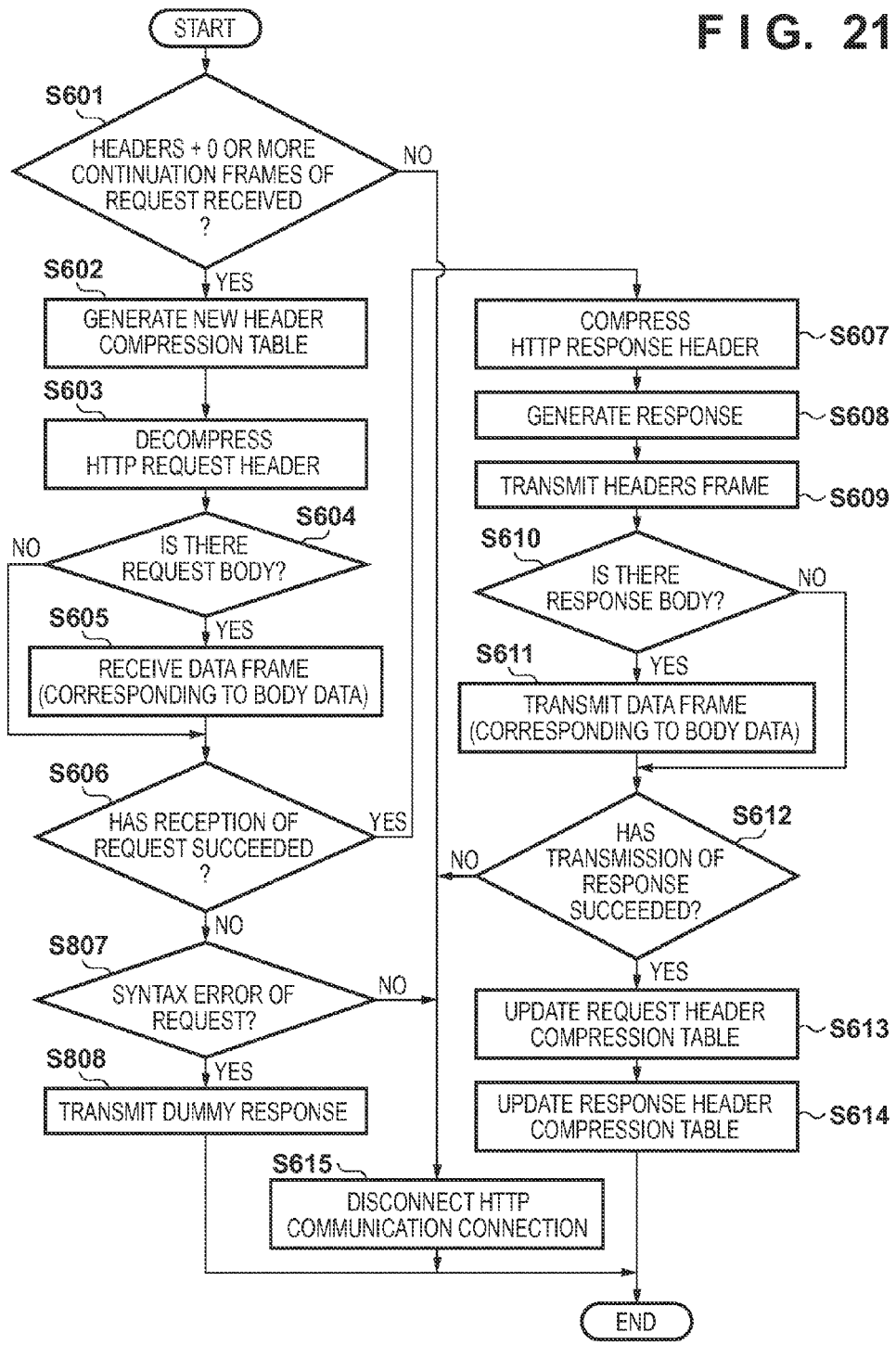
FIG. 21 is a flowchart showing procedures to, when a request syntax error is detected, determine that determination of the integrity of the header compression table generation function is necessary.

Procedures to, when a request syntax error is detected, determine that determination of the integrity of the header compression table generation function is necessary are shown in the flowchart of FIG. 21. Note that the same reference numerals (S601 to S615) as those in FIG. 15 denote the same processes, and a detailed description thereof will not be repeated. Transmission of a dummy response and reception of a request when determining the integrity are the same as those in the first embodiment, and a detailed description thereof will not be repeated.

The HTTP communication control unit 307 determines whether reception of a request from the communication apparatus 10 has succeeded (S606). If the reception of the request has failed, the HTTP communication control unit 307 determines whether the cause is a syntax error of the request (S807). If the syntax error is not the cause, the HTTP communication control unit 307 disconnects the HTTP communication connection with the communication apparatus 10 (S615), and ends the process.

If the reception failure of the request arises from a syntax error of the request, the integrity determination unit 312 uses the HTTP communication control unit 307 to transmit, to the communication apparatus 10, a dummy response for determining the integrity of the header compression table generation function (S808). If a mismatch of the header compression table generation function is detected, it is determined that the message abnormality arises from a header compression table generation unit 310 or table update unit 311 of the communication apparatus 10. In this case, the HTTP communication control unit 307 of the communication apparatus 20 transmits an error message, disconnects the HTTP communication connection with the communication apparatus 10, and stops the use of HTTP/2 in communication between the communication apparatuses 10 and 20.

If the integrity of the header compression table generation function is maintained, it is determined that the message abnormality arises from neither the table generation unit 310 nor table update unit 311 of the communication apparatus 10. In this case, the HTTP communication control unit 307 of the communication apparatus 20 demands retransmission of the request.

In this way, when the communication apparatus 20 detects a request syntax error in HTTP communication with the communication apparatus 10, it determines the integrity of the header compression table generation function, and determines the validity of use of header compression using the header compression table. Therefore, a communication error arising from a mismatch of the header compression table can be detected, and highly reliable communication becomes possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-161894 filed Aug. 7, 2014 which is hereby incorporated by reference herein in its entirety.

What is claimed is:

1. A communication apparatus comprising:
a generation unit configured to generate a first table used for compression of a message to be transmitted to another communication apparatus and decompression of a compressed message received from the other communication apparatus, wherein the first table associates an index with data;
an update unit configured to update the first table based on data contained in a message to be transmitted to the other communication apparatus after the first table is generated by the generation unit;
a guide unit configured to guide the other communication apparatus to transmit a predetermined message corresponding to a specific index in the first table by the other communication apparatus; and
a determination unit configured to determine integrity of the first table updated by the update unit and a second table used in the other communication apparatus by referring to the predetermined message received from the other communication apparatus, wherein the second table is used for compression of a message to be transmitted to the communication apparatus and decompression of a compressed message received from the communication apparatus in the other communication apparatus,
wherein at least one of the generation unit, the update unit, the guide unit, or the determination unit is implemented using a processor.

2. The communication apparatus according to claim 1, further comprising an invalidation unit configured to invalidate at least part of records in the updated first table according to a determination result of the determination unit.

3. The communication apparatus according to claim 1, further comprising a notification unit configured to notify the other communication apparatus of a message according to a determination result of the determination unit.

4. The communication apparatus according to claim 1, wherein the determination unit performs the determination of the integrity by referring an index contained in the predetermined message transmitted by the other communication apparatus in accordance with the guide unit.

5. The communication apparatus according to claim 1, further comprising a detection unit configured to detect an error in a message received from the other communication apparatus,
wherein the guide unit performs the guide to transmit the predetermined message by the other communication apparatus in response to detection of the error by the detection unit.

6. A communication method of a communication apparatus, the method comprising:
using a processor to perform steps of:
generating a first table used for compression of a message to be transmitted to another communication apparatus and decompression of a compressed message received from the other communication apparatus, wherein the first table associates an index with data;

updating the first table based on data contained in a message to be transmitted to the other communication apparatus after the first table is generated in the generating step;

guiding the other communication apparatus to transmit a predetermined message corresponding to a specific index in the first table by the other communication apparatus; and determining integrity of the first table updated in the updating step and a second table used in the other communication apparatus by referring to the predetermined message received from the other communication apparatus, wherein the second table is used for compression of a message to be transmitted to the communication apparatus and decompression of a compressed message received from the communication apparatus in the other communication apparatus.

7. The method according to claim 6, wherein the processor further performs a step of invalidating at least part of records in the updated first table according to a determination result in the determining step.

8. The method according to claim 6, wherein the processor further performs a step of notifying the other communication apparatus of a message according to a determination result in the determining step.

9. A non-transitory computer readable medium storing a computer-executable program for causing a computer to perform a communication method of a communication apparatus, the method comprising steps of:

generating a first table used for compression of a message to be transmitted to another communication apparatus and decompression of a compressed message received from the other communication apparatus, wherein the first table associates an index with data;

updating the first table based on data contained in a message to be transmitted to the other communication apparatus after the first table is generated in the generating step;

guiding the other communication apparatus to transmit a predetermined message corresponding to a specific index in the first table by the other communication apparatus; and determining integrity of the first table updated in the updating step and a second table used in the other communication apparatus by referring to the predetermined message received from the other communication apparatus, wherein the second table is used for compression of a message to be transmitted to the communication apparatus and decompression of a compressed message received from the communication apparatus in the other communication apparatus.

10. The medium according to claim 9, further comprising a step of invalidating at least part of records in the updated first table according to a determination result in the determining step.

11. The medium according to claim 9, further comprising a step of notifying the other communication apparatus of a message according to a determination result in the determining step.

* * * * *